INVENTOR.
KENNETH C. ALLEN
BY
ATTORNEYS

Aug. 9, 1960 K. C. ALLEN 2,948,464
COMPUTING MECHANISM
Filed June 11, 1954 36 Sheets-Sheet 2

INVENTOR.
KENNETH C. ALLEN
BY
Marechal, Biebel, French & Bugg
ATTORNEYS

Aug. 9, 1960  K. C. ALLEN  2,948,464
COMPUTING MECHANISM
Filed June 11, 1954  36 Sheets-Sheet 3

FIG-4

| COLUMN NO. | | | | | | | |
|---|---|---|---|---|---|---|---|
| 7 | 6 | 5 | 4 | 3 | 2 | 1 | 0 |
|   |   |   |   | 2 | 3 | 8 | 9 |
|   |   |   |   |   | 1 | 3 | 7 |
|   |   |   |   |   |   |   | ¾ |
|   |   |   |   |   |   | 6 | 7 |
|   |   |   |   |   | 6 | 0 |   |
|   |   |   |   | 2 | 2 |   |   |
|   |   |   |   | 5 |   | 6 | 3 |
|   |   |   |   | 5 | 6 |   |   |
|   |   |   | 2 | 1 |   |   |   |
|   |   | 1 | 4 |   | 2 | 7 |   |
|   |   |   |   | 2 | 4 |   |   |
|   |   |   | 2 |   |   |   |   |
|   |   |   | 9 |   |   |   |   |
|   | 0 | 6 |   |   | 9 |   |   |
|   |   |   | 0 |   |   |   |   |
|   |   | 0 | 8 |   |   |   |   |
|   | 0 | 3 |   |   |   |   |   |
| 0 | 2 |   |   |   |   |   |   |
| CARRIES | 1 | 2 | 3 | 2 |   |   |   |
| 3 | 2 | 9 | 0 | 7 | 9 | 7 |   |

FIG-4a

| COLUMN NO. | | | | | | | |
|---|---|---|---|---|---|---|---|
| 7 | 6 | 5 | 4 | 3 | 2 | 1 | 0 |
| WEIGHT PRICE | | | W | X P | Y Q | Z R | F |
|   |   |   |   |   | YFT | (ZFT) | (ZFU) |
|   |   |   |   | XFT | XFU | (YFU) |   |
|   |   |   | WFT | WFU |   |   |   |
|   |   |   |   |   | YRT | ZRT | (ZRU) |
|   |   |   |   | XRT | YRU |   |   |
|   |   |   | WRT | WRU | XRU |   |   |
|   |   |   |   | YQT | ZQT |   |   |
|   |   |   | XQT | XQU | YQU | ZQU |   |
|   |   | WQT | WQU |   |   |   |   |
|   |   |   | (YPT) | (ZPT) | ZPU |   |   |
|   |   | (XPT) | XPU | YPU |   |   |   |
| (WPT) | WPU |   |   |   |   |   |   |
| (K7) | K6 | K5 | K4 | K3 | K2 | CARRIES | |
| VALUE | S | T | U | V |   |   |   |

FIG-5

| COLUMN NO. | | | | |
|---|---|---|---|---|
| 6 | 5 | 4 | 3 | 2 |
|   | 2 | 3 | 8 | 9 |
|   |   | 1 | 3 | 7 |
|   |   |   |   | ¾ |
| CARRIES | 1 | 2 | 3 | 3 | ⑤ |
| 2 | 3 | 8 | 9 |   |
| 0 | 0 | 2 | 2 |   |
|   | 6 | 9 | 4 | 7 |
|   | 1 | 2 | 5 | 6 |
|   |   | 2 | 1 | 6 |
|   |   | 4 | 2 | 6 |
|   |   | 1 | 6 | 5 |
|   |   |   |   | 2 |
| 3 | 2 | 9 | 1 |   |

FIG-5a

| COLUMN NO. | | | | | | |
|---|---|---|---|---|---|---|
| 6 | 5 | 4 | 3 | 2 | | |
| WEIGHT PRICE | | W | X P | Y Q | Z R | F |
| K6 | K5 | K4 | K3 | ⑤ | CARRIES | |
| WPU | XPU | YPU | ZPU |   |   |   |
| WQT | XQT | YQT | ZQT |   |   |   |
|   | WQU | XQU | YQU | ZQU |   |   |
|   | WRT | XRT | YRT | ZRT |   |   |
|   |   | WRU | XRU | YRU |   |   |
|   |   | WFT | XFT | YFT |   |   |
|   |   |   | WFU | XFU |   |   |
| VALUE | S | T | U | V |   |   |

*INVENTOR.*
KENNETH C. ALLEN
BY
ATTORNEYS

FIG-8

PRICE IN DIGITS

UNITS

| Weight | 0 | 1 | 2 | 3 | 4 | 5 | 6 | 7 | 8 | 9 |
|---|---|---|---|---|---|---|---|---|---|---|
| 9 | .0 | .9 | .8 | .7 | .6 | .5 | .4 | .3 | .2 | .1 |
| 8 | .0 | .8 | .6 | .4 | .2 | .0 | .8 | .6 | .4 | .2 |
| 7 | .0 | .7 | .4 | .1 | .8 | .5 | .2 | .9 | .6 | .3 |
| 6 | .0 | .6 | .2 | .8 | .4 | .0 | .6 | .2 | .8 | .4 |
| 5 | .0 | .5 | .0 | .5 | .0 | .5 | .0 | .5 | .0 | .5 |
| 4 | .0 | .4 | .8 | .2 | .6 | .0 | .4 | .8 | .2 | .6 |
| 3 | .0 | .3 | .6 | .9 | .2 | .5 | .8 | .1 | .4 | .7 |
| 2 | .0 | .2 | .4 | .6 | .8 | .0 | .2 | .4 | .6 | .8 |
| 1 | .0 | .1 | .2 | .3 | .4 | .5 | .6 | .7 | .8 | .9 |

(WEIGHT IN DIGITS — 125 selector shown at rows 6–9)

TENS

| Weight | 0 | 1 | 2 | 3 | 4 | 5 | 6 | 7 | 8 | 9 |
|---|---|---|---|---|---|---|---|---|---|---|
| 9 | .0 | .0 | .1 | .2 | .3 | .4 | .5 | .6 | .7 | .8 |
| 8 | .0 | .0 | .1 | .2 | .3 | .4 | .4 | .5 | .6 | .7 |
| 7 | .0 | .0 | .1 | .2 | .2 | .3 | .4 | .4 | .5 | .6 |
| 6 | .0 | .0 | .1 | .1 | .2 | .3 | .3 | .4 | .4 | .5 |
| 5 | .0 | .0 | .1 | .1 | .2 | .2 | .3 | .3 | .4 | .4 |
| 4 | .0 | .0 | .0 | .1 | .1 | .2 | .2 | .2 | .3 | .3 |
| 3 | .0 | .0 | .0 | .0 | .1 | .1 | .1 | .2 | .2 | .2 |
| 2 | .0 | .0 | .0 | .0 | .0 | .1 | .1 | .1 | .1 | .1 |

(125 selector shown at rows 6–9)

INVENTOR.
KENNETH C. ALLEN

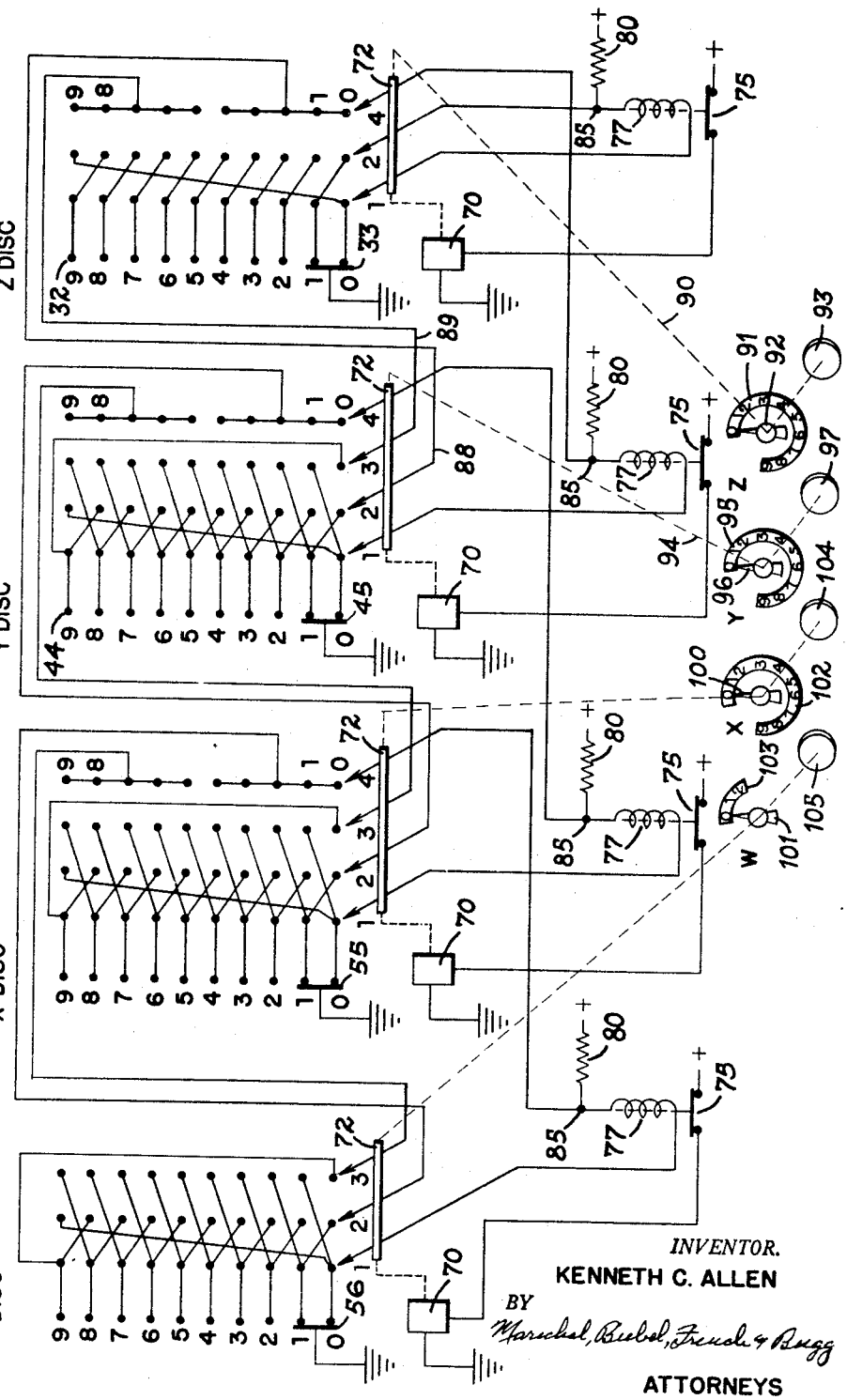

Aug. 9, 1960 K. C. ALLEN 2,948,464
COMPUTING MECHANISM
Filed June 11, 1954
36 Sheets-Sheet 6

INVENTOR.
KENNETH C. ALLEN
BY
ATTORNEYS

Aug. 9, 1960 K. C. ALLEN 2,948,464
COMPUTING MECHANISM
Filed June 11, 1954 36 Sheets-Sheet 7
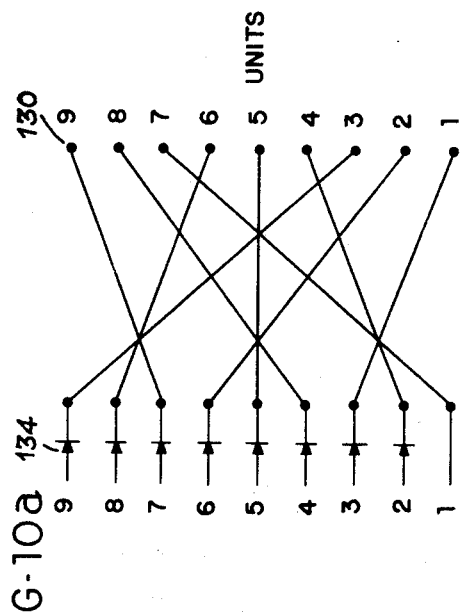
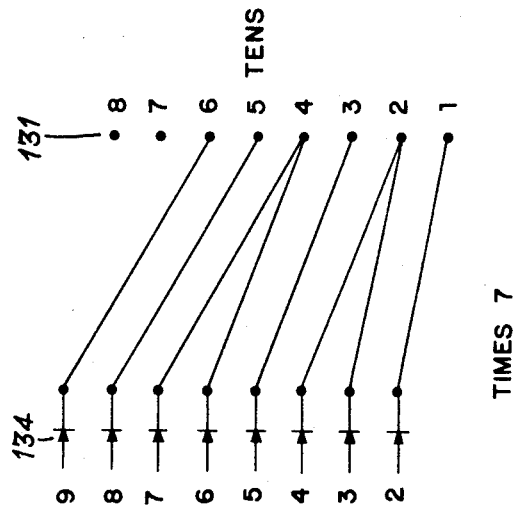
TIMES 7
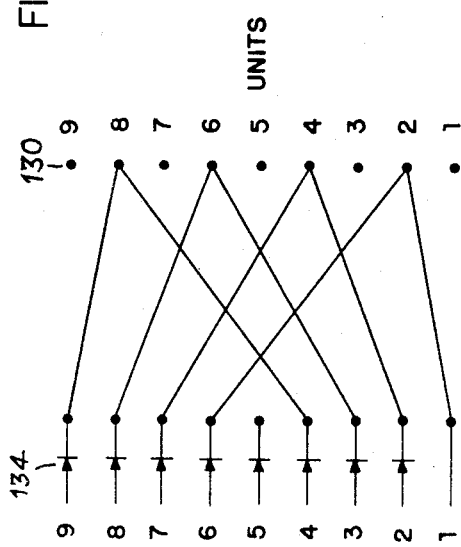
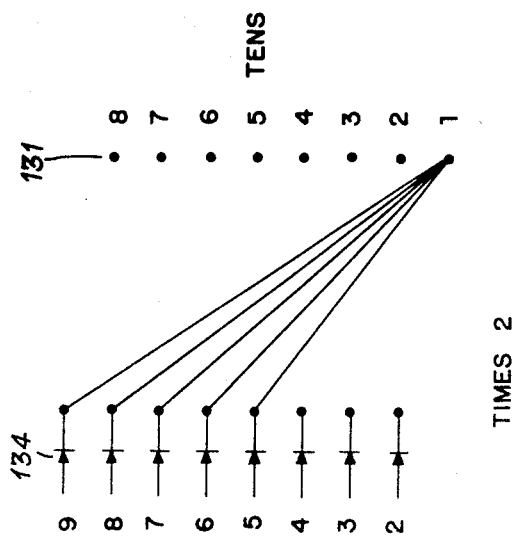
TIMES 2
INVENTOR.
KENNETH C. ALLEN
BY
ATTORNEYS

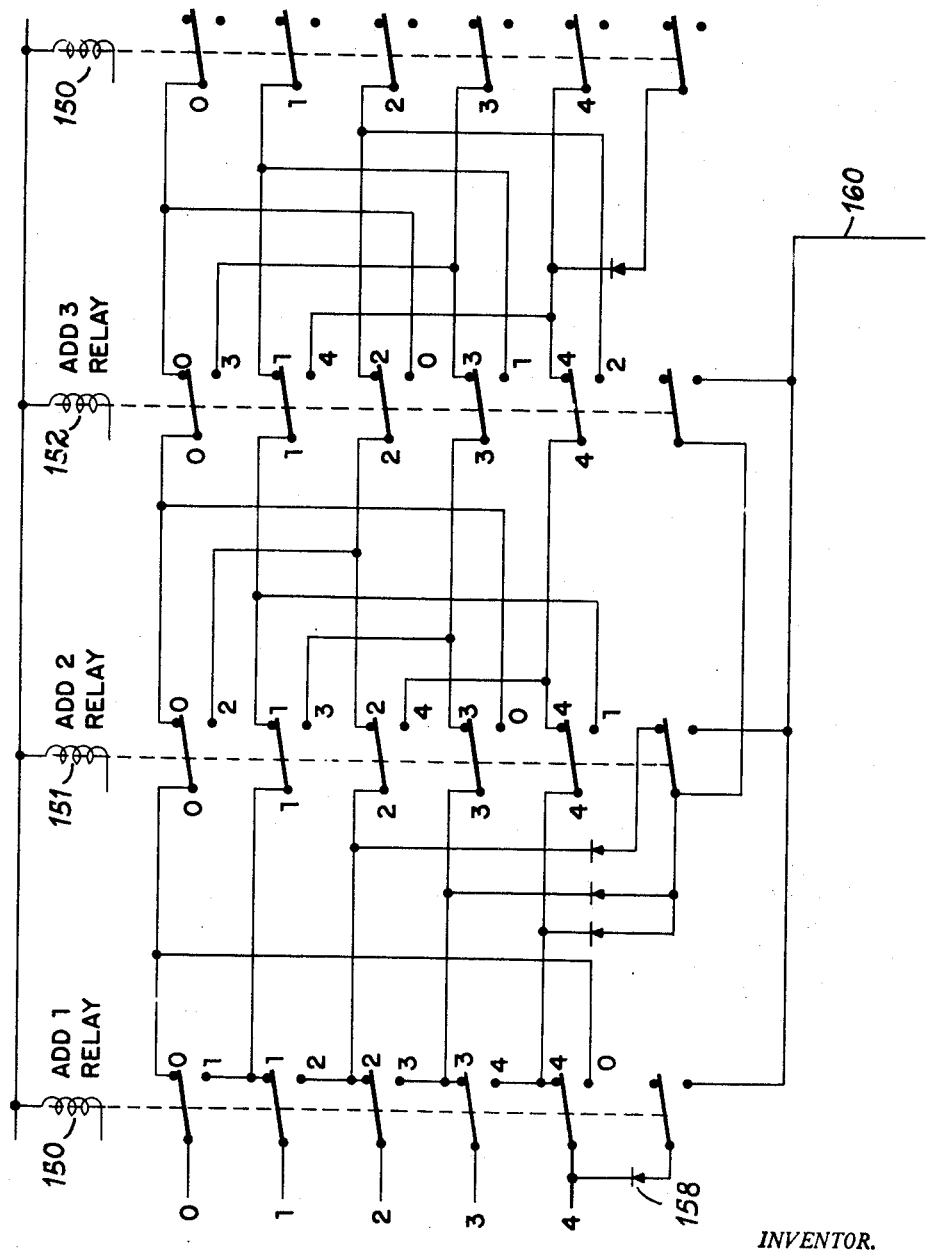

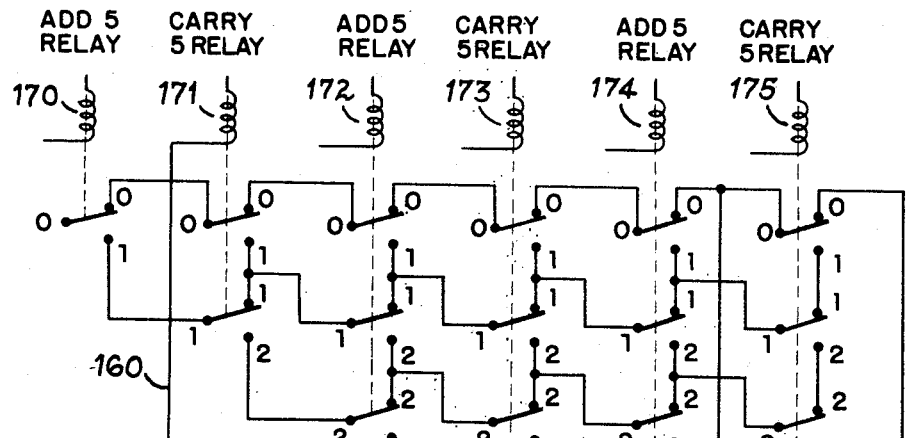
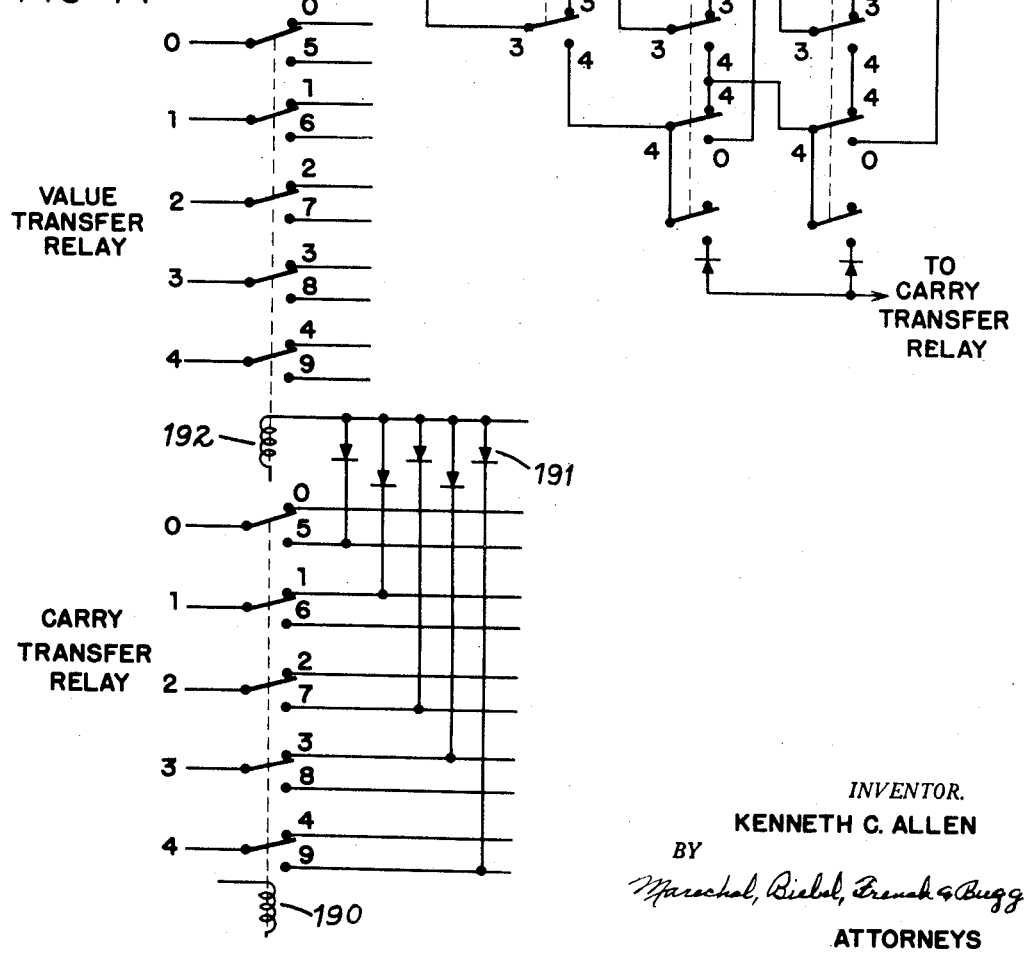

Aug. 9, 1960

K. C. ALLEN 2,948,464

COMPUTING MECHANISM

Filed June 11, 1954

INVENTOR.
KENNETH C. ALLEN
BY

ATTORNEYS

Aug. 9, 1960 K. C. ALLEN 2,948,464
COMPUTING MECHANISM
Filed June 11, 1954 36 Sheets-Sheet 13

E DECK OF W STEPPING SWITCH
E DECK OF X STEPPING SWITCH

INVENTOR.
KENNETH C. ALLEN
BY
Marechal, Biebel, French & Bugg
ATTORNEYS

Aug. 9, 1960 K. C. ALLEN 2,948,464
COMPUTING MECHANISM

Filed June 11, 1954 36 Sheets—Sheet 14

| FIG. 26 | FIG. 32 | FIG. 40 |
|---|---|---|
|  | FIG. 34 | FIG. 42 |
|  | FIG. 33 | FIG. 41 |
| FIG. 25 | FIG. 31 | FIG. 39 |
| FIG. 24 | FIG. 30 | FIG. 38 |
| FIG. 23 | FIG. 29 | FIG. 37 |
| FIG. 22 | FIG. 28 | FIG. 36 |
| FIG. 21 | FIG. 27 | FIG. 35 |

FIG-20

INVENTOR.
KENNETH C. ALLEN
BY
ATTORNEYS

Aug. 9, 1960

K. C. ALLEN 2,948,464

COMPUTING MECHANISM

Filed June 11, 1954

INVENTOR.
KENNETH C. ALLEN
BY
*Marshal, Biebel, French & Bugg*
ATTORNEYS

Aug. 9, 1960  K. C. ALLEN  2,948,464
COMPUTING MECHANISM
Filed June 11, 1954  36 Sheets-Sheet 18

INVENTOR.
KENNETH C. ALLEN
BY
Marechal, Biebel, French & Bugg
ATTORNEYS

Aug. 9, 1960    K. C. ALLEN    2,948,464
COMPUTING MECHANISM
Filed June 11, 1954    36 Sheets-Sheet 19

INVENTOR.
KENNETH C. ALLEN
BY
Mareschal, Biebel, French & Bagg
ATTORNEYS

Aug. 9, 1960 K. C. ALLEN 2,948,464
COMPUTING MECHANISM
Filed June 11, 1954 36 Sheets-Sheet 31

INVENTOR.
KENNETH C. ALLEN
BY
ATTORNEYS

Aug. 9, 1960 K. C. ALLEN 2,948,464
COMPUTING MECHANISM
Filed June 11, 1954 36 Sheets-Sheet 32

INVENTOR.
KENNETH C. ALLEN
BY
Marechal, Biebel, French & Bugg
ATTORNEYS

Aug. 9, 1960   K. C. ALLEN   2,948,464
COMPUTING MECHANISM
Filed June 11, 1954   36 Sheets-Sheet 33

INVENTOR.
KENNETH C. ALLEN
BY
ATTORNEYS

Aug. 9, 1960   K. C. ALLEN   2,948,464
COMPUTING MECHANISM
Filed June 11, 1954   36 Sheets-Sheet 34
FIG-40
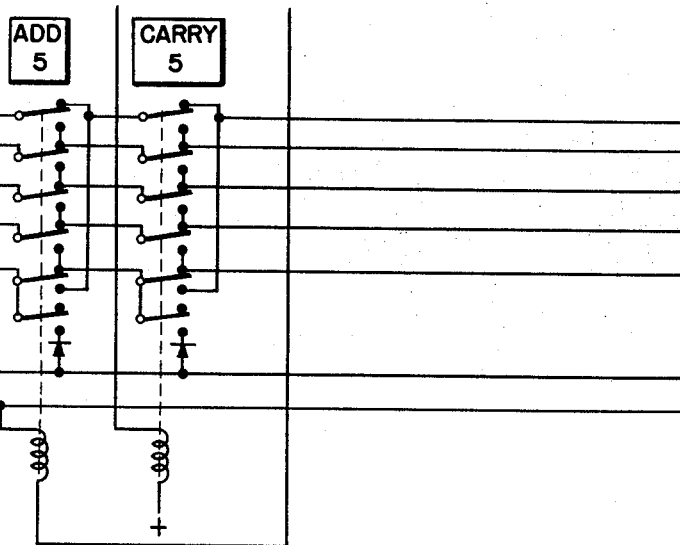
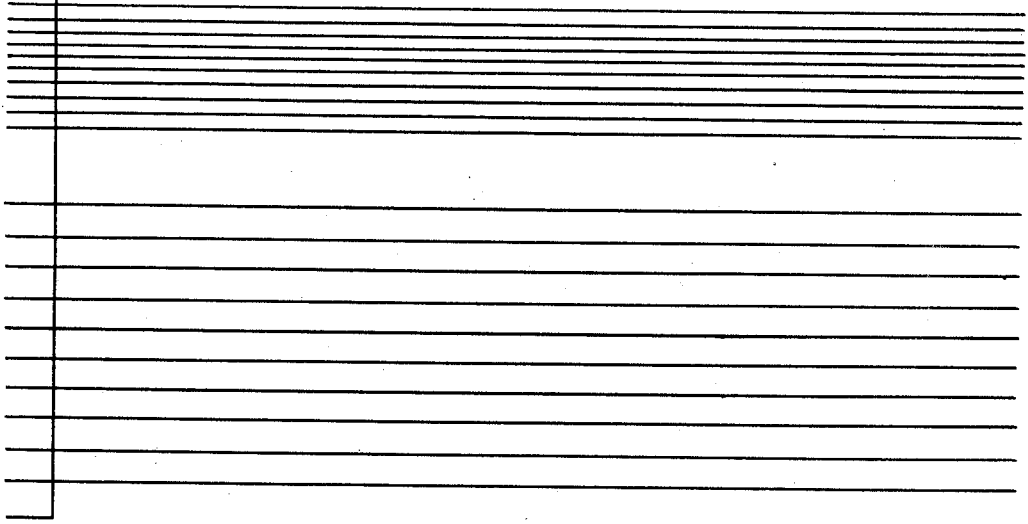
INVENTOR.
KENNETH C. ALLEN
BY
*Marechal, Biebel, French & Bugg*
ATTORNEYS

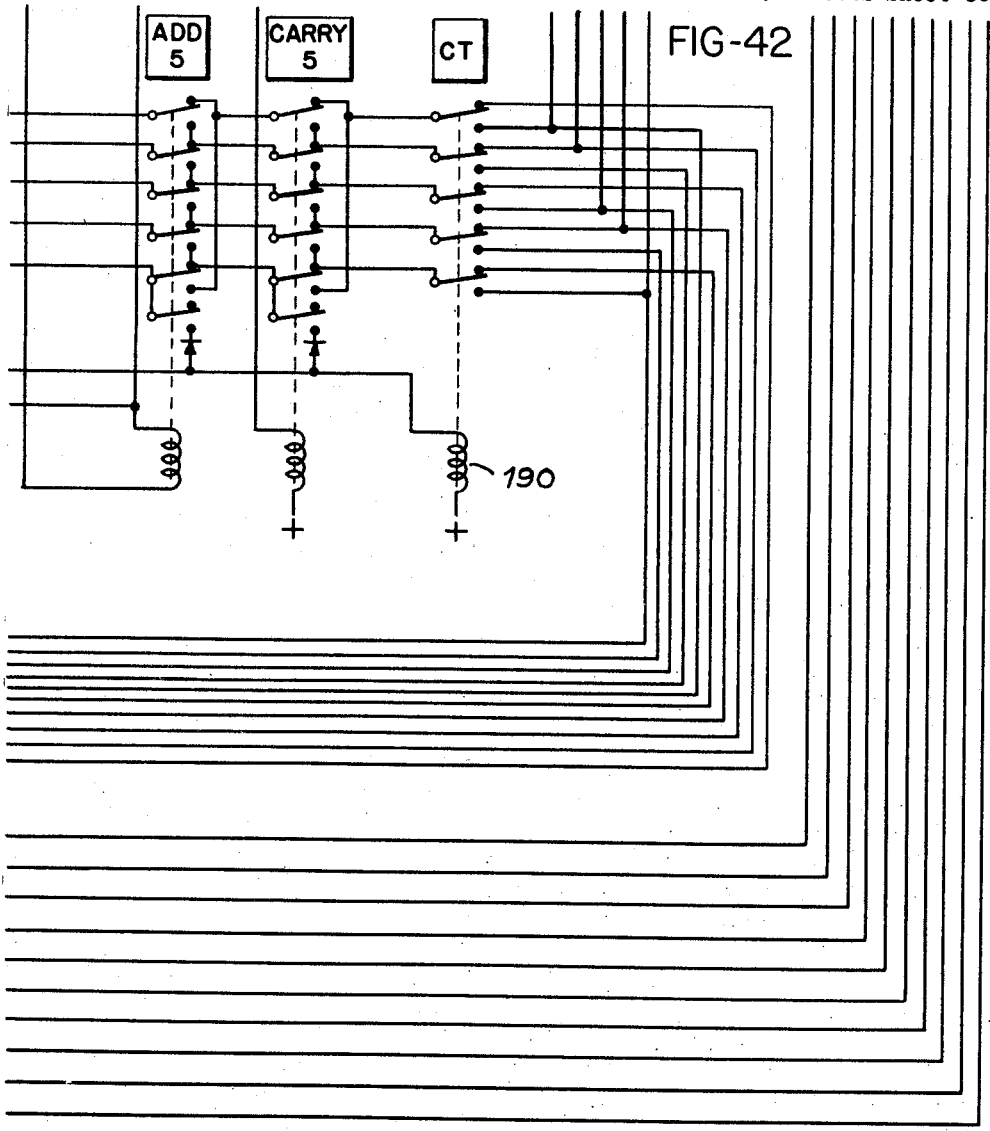

form of power operating scale suitable for use in conjunction with the present invention, and which shows further details of the manner in which such scale may be constructed. Briefly, however, the scale pan 10 (Fig. 1) is supported by weighing mechanism which by any well-known conventional means moves arm 13 a distance proportional to weight, the arm being arranged to actuate an upper contact 14, or a lower contact 15. Any suitable counterbalancing mechanism desired may be used, such mechanism forming no part of the present invention.

United States Patent Office 2,948,464
Patented Aug. 9, 1960

2,948,464

COMPUTING MECHANISM

Kenneth C. Allen, Dayton, Ohio, assignor to The Hobart Manufacturing Company, Troy, Ohio, a corporation of Ohio Filed June 11, 1954, Ser. No. 436,218

25 Claims. (Cl. 235—58)

This invention relates to computing mechanism and more particularly to such a mechanism employing relays and selector switches.

The invention is of special interest and application in connection with a measuring instrument such as a weighing scale, and provides for furnishing an indication and a record of the weight, the unit price, and the value of the article being weighed. It is further adapted for actuating a recording device or register to provide a tape and a total of a series of such transactions.

It is the principal object of the invention to provide a computing system for computing the value of a product of two factors each of which may be independently selected as desired, which mechanism is rapid and accurate in its operation and which is relatively simple and inexpensive to produce and operate.

It is a further object of the invention to provide readout means for sensing and responding digitally to the position of a movable element, such as a shaft which rotates in accordance with the weight of an article for example, thereby furnishing rapidly and accurately a decimal reading of each position assumed by the shaft.

It is also an object of the invention to provide a readout device for accurately reading the position of a series of decade switches which are adapted to be actuated in a continuous cycle in accordance with a variable function, providing an accurate setting of each higher order position on the basis of the position occupied by each lower order element in the system.

It is another object to provide an electrical multiplying system for such a computer in which partial products of each digit of one factor by the digits of the other factors are produced and arranged in columns of corresponding value preparatory to summation of each such column.

It is also an object to provide a system of summation in which decimal members arranged in multiple columns are converted to a coded quinary basis in which they are added by columns and the total converted to proper decimal equivalent for obtaining the final result in each column and the proper carries for the next column.

It is a still further object to provide a system which is economical in its use of equipment and which has such flexibility and adaptability that by suitable addition or deletion of components it may be used for many different types and ranges of multiplying operations.

Referring to the drawings which illustrate a preferred embodiment of the invention:

Fig. 3 is a diagrammatic view of the weight read-out and stepping switches;

Fig. 4 is a respresentative arrangement showing how an ordinary multiplication operation of two multi-digit factors, one including a fraction, may be carried out;

Fig. 4a is a similar arrangement worked out on an algebraic basis;

Fig. 5 shows a mathematical rearrangement of the problem of Fig. 4;

Fig. 5a is a similar rearrangement of the algebraic problem of Fig. 4a;

Fig. 8 is a schematic view of one of the precomputed electrical multiplying tables;

Figs. 10 and 10a are diagrammatic views showing two illustrative settings of one of the selector switches forming part of the precomputed table;

Fig. 12 is a diagrammatic view of one of the adding circuits;

Fig. 13 is a similar view of an adding circuit for producing carry results;

Fig. 14 is a diagrammatic view of the circuits of the value transfer relay and carry transfer relay;

Fig. 20 is a diagram indicating the pattern in which the circuit diagrams of Figs. 21 through 42 are to be combined in order to form a composite diagram showing the complete system of the invention.

Scale read-out

Figure 1:
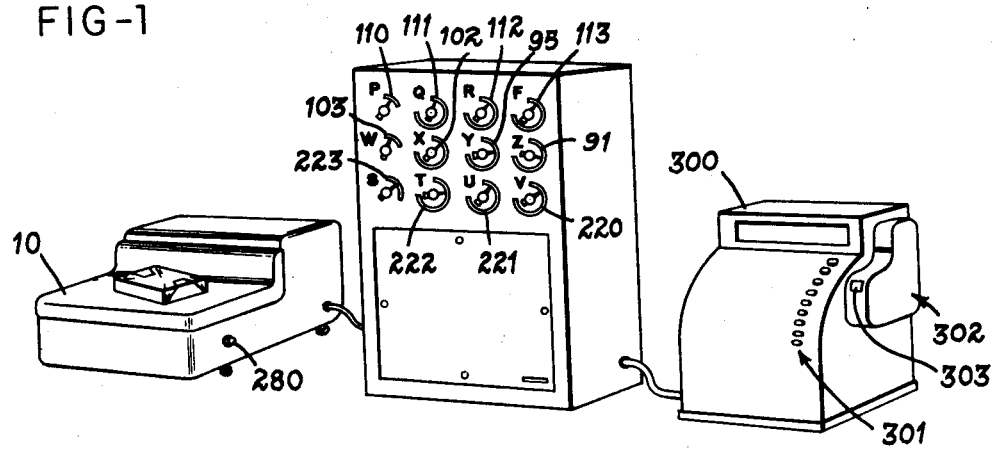
Fig. 1 is a general perspective view of the weighing, computing and registering system in accordance with the present invention.

Reference is made to applicant's copending application Serial No. 376,136, filed August 24, 1953, which shows a Contacts 14 and 15 are both mounted on a bracket 16, and are connected by lines 17 and 18 respectively to a drive motor 20 which is thus caused to rotate selectively forward or backward depending on whether arm 13 closes switch 14 or switch 15. Motor 20 drives worm shaft 21 which rotates worm gear 22 carrying shaft 23 which extends through a nut 24 fixed to the bracket 16. This forms a follow-up system for moving the bracket and the respective switches 14 and 15 so that in response to a displacement of the lever, the motor 20 will be energized in the proper direction, and will continue in operation for sufficient amount of travel to restore the switches 14 and 15 to the neutral position illustrated, at which time the motor will come to rest.

Figure 2:
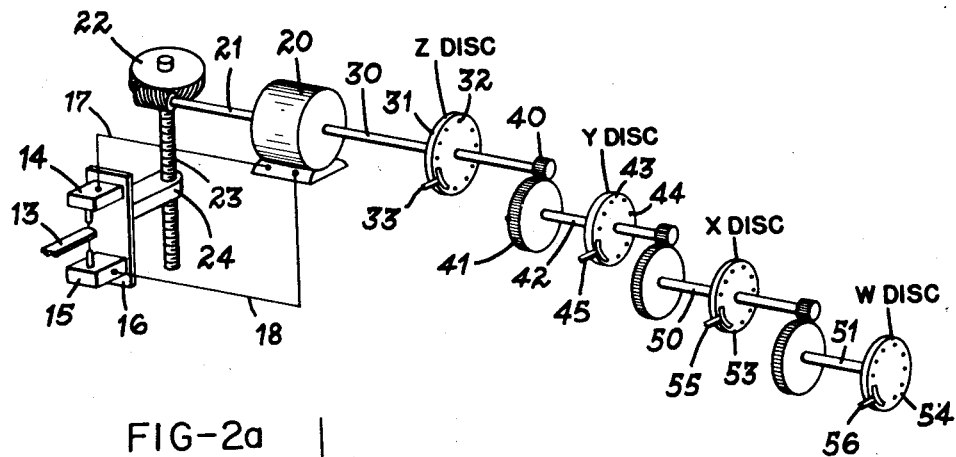
Fig. 2 is a view in perspective of the weight read-out mechanism.
Figure 2A:
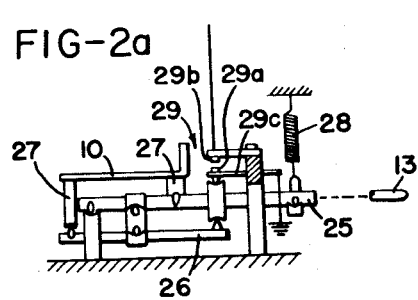
Fig. 2a is a diagrammatic view of a typical weighing mechanism for use in the system of Fig. 1.

The operation of the weighing mechanism may be more readily understood from the diagrammatic showing in Fig. 2a, wherein the arm 13 is illustrated as an extension of the main lever 25 which is part of a double lever system including a secondary lever 26 and vertical members 27 for supporting the pan or platter 10, and a spring 28 represents the counterbalancing mechanism. Fig. 2a also shows the no-load switch indicated generally at 29 for detecting the presence of a load on the pan 10, this switch including a movable contact 29a cooperating with a fixed contact 29b to form a switch which is open when there is no load on the pan. As shown, the contact 29a is carried on a light spring arm 29c insulated from the scale and of such biasing force that application of a weight to the pan in excess of a predetermined small amount will cause contacts 29a and 29b to close and to remain closed as long as the weight is on the pan.

Referring again to Figs. 2 and 2a, the lever 25 and arm 13 normally occupy a no-load position corresponding to zero, but when a load is applied to the pan 10, the lever 25 is deflected to a balance position corresponding to the weight of the load. Such deflection of the lever will in turn actuate the appropriate switch 14 or 15 to energize the motor 20 in the direction to drive the shaft 23 until the switches 14 and 15 are again both in neutral position. Since the scale arm 13 moved with the lever 25 to a position corresponding to the weight of the load, the motor shaft 21 will thus turn through an angle directly corresponding to this weight.

In order to transmit an indication of that angle and hence of the weight represented thereby, the shaft 21 is extended as shown at 30 and a disk 31 having a series of ten contacts 32 is associated therewith, such contacts being spaced around its periphery and being used for sensing the position thereof. The drive is preferably such that shaft 30 makes 10 revolutions per pound of weight. A wiper 33 is illustrated which has a width sufficient to span a pair of the disk contacts, such that the wiper 33 may rest either on a single one of contacts 32, or may bridge an adjacent pair thereof. While the disk 31 has been illustrated as rotating and the wiper 33 as stationary, this is intended to be a diagrammatic representation only, and any suitable combination of fixed and movable members may be provided to accomplish the function above described.

Shaft 30 extends through disk 31 and on its extended end carries pinion 40 driving gear 41 in such ratio that the large gear makes one revolution for ten revolutions of shaft 30. Shaft 42 driven by gear 41 carries a contact disk 43 having a series of ten contacts 44 thereon which cooperate with the wiper 45 in the same manner as indicated above with respect to disk 31. Similarly, shafts 50 and 51 are driven at 1/10 and 1/100 the speeds respectively of shaft 42 and have contact disks 53, 54 and wipers 55, 56, respectively associated therewith.

For purposes of illustration in connection with an ordinary weighing and computing scale, disk 31 is considered as reading in hundredths of pounds, and hence disks 43, 53 and 54 read in tenths of pounds, in pounds, and in tens of pounds, respectively.

For further purposes of analysis, the disk 31 is identified as the Z disk, and disks 43, 53 and 54 as the Y, X and W disks, respectively.

Referring now to Fig. 3, the arrangement of selector switches is shown which provides for sensing or reading out the position of the several disks W, X, Y and Z. A suitable form of selector switch for this and similar purposes throughout this system is a stepping switch, such as a telephone type stepping switch or a rotary selector switch driven by a motor and clutch or other power means. The Z disk 31 is indicated in the upper portion of the drawing with the 10 contacts 32 thereof identified as 0 to 9 respectively, and with the wiper 33 represented as traveling progressively across such contacts, and having a ground connection.

The operating mechanism for the Z selector switch is indicated somewhat diagrammatically at 70, such switches being well known in the art and having an operating coil which steps the contact assembly 72 around with a continuous rotary motion with a series of movements which may be either continuous or step-by-step, bringing its several wipers 1, 2 and 4 into progressive contact with the series of fixed contact points as indicated, the contacts being indicated in a straight line only for simplicity. For purposes of illustration stepping switches operating with a step-by-step movement will be described. When energized, each such stepping switch will continue to operate in an endless cycle until the circuit to its operating mechanism is interrupted at normally closed back contacts 75 of a relay 77. Thus when relay 77 is energized, it opens its back contacts 75, the supply circuit to the stepping switch is broken, and the switch immediately stops. As is well understood in the art, the switch has mechanical means which assures that it will always stop on an even switch closing position. Also, for purposes of simplicity and illustration, the stepping switch Z has been indicated as having a relay 77 which is entirely separate from the corresponding relay for stepping switches W, X and Y whereas in the comprehensive diagram, for purposes of reduction of necessary elements, the same relay is included successively in the control circuit for each of the stepping switches in sequence.

In order to read out the position of the Z disk, only two wipers and two decks of contacts on the Z stepping switch are required, namely, the 1 and 2 wipers. Additional contact decks and wipers are used for other purposes and will be described in connection with their part in the system. It is the function of the Z stepping switch to sense the position of the Z disk, to stop when it reaches a position corresponding to the single contact point which wiper 33 rests upon, and to proceed to the higher such contact where wiper 33 bridges a pair of the Z contacts. This operation may be described as follows.

With wiper 33 engaging only one of the series of its contacts 0–9, stepping switch 70 proceeds to advance its group of wipers until its 2 wiper reaches the position in advance of the contact so engaged. When this occurs a ground is applied to common point 85 of resistor 80, and a current flows from plus to ground, but this has no effect upon the relay 77. The switch continues to the next position at which wiper 1 engages the contact on which the wiper 33 has stopped, with the result that relay 77 is grounded, and a current thus flows therethrough, energizing relay 77, breaking the energizing circuit for the stepping switch, and causing it to come to rest in the position corresponding to that on which wiper 33 has stopped.

Assuming now that wiper 33 bridges contacts 2 and 3 of the Z switch, the operation continues as before but in addition to the energizing circuit for relay 77, wiper 2 short-circuits the solenoid when the stepping switch reaches its 2 position. As a result, the stepping switch continues to advance to its 3 position. In this position the solenoid circuit is grounded through wiper 1, while the circuit through wiper 2 is opened and hence the stepping switch comes to rest at the 3 position. Thus the Z stepping switch is caused to hunt until it comes to rest on either the single position corresponding to that occupied by wiper 33 or to the highest of the positions bridged by the wiper.

Referring now to the operation of the remaining stepping switches W, X and Y, all of which are connected and operate in a manner somewhat different from switch Z but similar to each other, the reading out of the higher decade positions involves an accurate determination of whether to stop on the lower or higher position when the switch in the next lower order is close to the 9 or 0 positions. That is, if the Z switch is on its 9 position, and the Y wiper is in a bridging position between 6 and 7, then it is obvious that the Y switch should stop at the 6 position, thereby producing a combined reading of 69. On the other hand if the Z switch stops on the 0 or 1 position with the Y wiper bridging its 6 and 7 contacts, then obviously the Y stepping switch should stop at its 7 position, to furnish a composite reading of 70, or 71, as the case may be. Accordingly the following additional controls are provided for securing this selective read-out, it being understood that each of the W, X and Y switches is connected and functions in a similar manner.

Referring to Fig. 3, the Y switch is shown as having the first deck or series of its contacts connected to the contacts 44 of the disk 43, the second deck being connected to the succeeding and the third deck to the preceding series of contacts, respectively. Switch arm 1 of the Y switch is connected to the relay 77 as before while the 2 switch arm is connected by line 88 to another series or deck of contacts on the preceding stepping switch, namely, the Z stepping switch, in the order as indicated. The lower contacts of this other deck of the Z switch are connected together, that is, from the 0 to the 4 position with the remaining contacts, 5 to 9 are likewise connected together and in turn connected to the 3 switch arm of the Y switch by line 89. The 4 switch arm of the Z switch is connected to the common point between resistor 80 and relay 77 of the Y switch.

In operation, where the wiper 45 stops on a single one of the Y disk contacts, the stepping and hunting operation is the same as described above in connection with the Z switch. Where however the wiper 45 bridges a pair of the Y disk contacts, the system functions as follows.

Assume that wiper 33 has stopped in the lower portion of its travel so that it is within the range of the 0 to 4 positions with wiper 45 between its 6 and 7 positions. Under these circumstances it is desired to have the Y switch proceed to its 7 position. Accordingly, when the Y switch reaches its 6 position, a ground circuit is established through relay 77 and the 1 wiper of switch Y, but a short circuit is established through the 2 wiper, line 88, the extra deck of contacts of the Z switch and its corresponding wiper 4, and back to common point 85 of the Y switch. The Y switch thus continues in operation until it reaches the 7 position at which time the short circuit is removed and it comes to rest.

Assuming now that the wiper 33 occupies the upper portion of its range in contact with the 5 to 9 set of the Z disk contacts, then it is desired to have the Y switch come to rest when it reaches its 6 position. This is accomplished by the fact that the circuit is grounded through the 1 wiper of the Y switch when it reaches the 6 position, the 2 wiper at this time being open-circuited. If the Y switch should already occupy its 7 position, then it is necessary that it be continued in operation for a full cycle to bring it around to its 6 position. This is effected by the 3 wiper of the Y switch which closes the circuit through line 89, the 4 wiper of the Z switch, and back to the common point 85 of switch Y, short-circuiting the relay 77 and allowing the Y switch to continue around for practically a full revolution.

Figure 9:
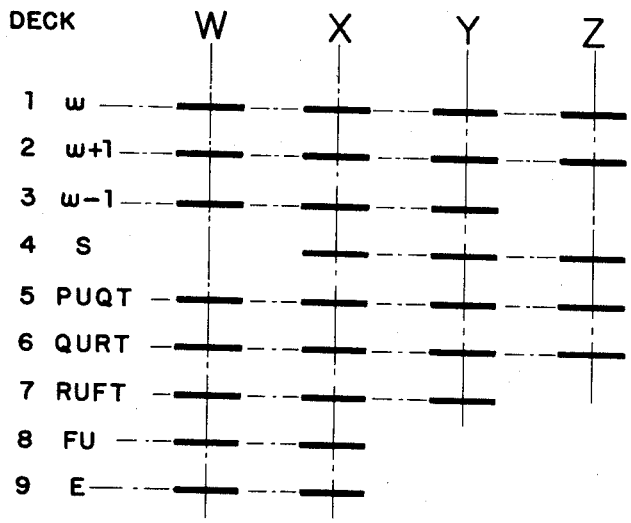
Fig. 9 is a schematic representation of the several decks on the weight read-out stepping switches.

It will be understood that switch Z has 1, 2 and 4 decks and wipers but no 3 deck or wiper as there is no switch ahead of it the position of which is to be sensed. Each of switches X and Y has all four decks and wipers while switch W has decks 1, 2 and 3 but not 4. Reference is also made to Fig. 9 diagrammatically representing the entire group of decks of these stepping switches, deck 1 being marked as $w$, deck 2 as $w+1$, deck 3 as $w-1$, and deck 4 as S, for sensing.

Fig. 3 also indicates a connection 90 from the moving contact assembly 72 of the Z switch to an indicator having dial 91 with a pointer 92 moving thereover to provide an indication of the hundredths of pounds position in the weighing operation. Such connection is also extended to effect corresponding setting of a type wheel 93 forming part of the ticket printer and where a register is used, may similarly be connected thereto.

Stepping switch Y has a connection 94 from its movable contact assembly to indicator dial 95 and pointer 96, as well as to type wheel 97. Similarly stepping switches X and W actuate pointers 100 and 101 on dials 102 and 103, and set type wheels 104 and 105 respectively providing for reading, indicating and printing the pounds and tens of pounds respectively. In this way a complete visual and printed record of the weight read-out is provided in four decimal places.

Principle of multiplication

Referring now to Figs. 4 and 4a, a typical mathematical problem is shown where in Fig. 4a the quantity 23.89 is multiplied by 1.37¾. For purposes of analysis, the first quantity could represent weight, i.e., 23.89 pounds, while the second quantity could represent price, i.e., $1.37 and ¾ cents per pound. Fig. 4 shows a process of multiplication in which individual partial products are produced representing the product of each digit of the multiplier and each digit of the multiplicand, such partial products incorporating a units position and a tens position which are aligned in adjacent columns.

In Fig. 4 this multiplication is done in the ordinary mathematical manner using a fractional multiplication table as well as a common multiplication table and writing out each partial product in full in a units and a tens column instead of having its tens portion added into the next column.

The comparable process is shown algebraically in Fig. 4a where the letters W, X, Y and Z are chosen to represent the four digits of the multiplicand as one factor and the letters P, Q, R and F to represent the three digits and the fractional portion of the multiplier respectively, as the other factor.

In the first line for example the partial products ZFT and ZFU represent the units and tenths portions of the product resulting from the fractional multiplication of the F fraction times the Z digit. Similarly the succeeding lines show the two decimal portions of each partial product of F times the several digits of the multiplicand.

On the next lower line there appear the partial products ZRT and ZRU representing respectively the tens and units portions respectively of the product of the digits R and Z. Similarly, and without further detailed analysis, it will be apparent that the complete table represents all of the partial products arranged in columns of corresponding decimal value, and there is throughout a direct analogy to the numerical problem shown in Fig. 4.

Referring again to Fig. 4, the line marked "Carries" at the bottom of the series of partial products represents the tens portion of each sum of the several columns which must be carried over to the next scucceeding column. Thus the line of digits marked "Carries" represents the part of the sum of the lower order column which must be added in to the next higher order column.

Similarly the line marked "Carries" in Fig. 4a shows a series of digits represented as $K_1$ to $K_6$ respectively which corresponds in all respects with the carries shown in Fig. 4.

The partial products shown in Fig. 4 may obviously be rearranged into the pattern shown in Fig. 5, for ease and simplicity in effecting the summation of the several columns. It is obvious that the sum of any group of numbers will be the same regardless of the order in which they may be added.

Fig. 5a shows a rearrangement of the algebraic designations of the problem shown in Fig. 4a. Here the carries are placed at the top of each column and the various partial products are rearranged in a more orderly fashion such that for example WPU, XPU, YPU, etc., all appear on the same level. This is an advantage in doing the problem by mechanical means. Inspection of Fig. 5a will show it to be identical with Fig. 4a, with the following exceptions—the partial products in columns 0 and 1 of Fig. 4a have been eliminated because in this particular instance it is sufficient to compute to the nearest hundredth or the nearest penny and hundredths and thousandths of a cent become inconsequential. This is indicated in Fig. 4a by the brackets which enclose the four partial products in columns 0 and 1. Similarly where P does not exceed 1 there will be no tens component of the product of P and any of the digits of the other factor. The bracketed entries containing PT which appear in columns 4, 5, 6 and 7 of Fig. 4a have thus been eliminated.

Still further, since in the assumed problem where the weight does not exceed 24 pounds and the price does not exceed $2.00 under no conditions will the sum of the digits in column 6 exceed 9. The result therefore is that in the special case assumed for this system, the $K_7$ factor will be 0 and hence has been eliminated in the rearrangement of the partial products in Fig. 5a.

While the invention has been described with reference to this particular set of values for the multiplier and multiplicand, respectively, it will be understood that in the general case there is no reason for arbitrarily limiting either the range of the digits or the number of positions in either the multiplier or the multiplicand. Where however a system is intended as in the present case for particular application, it is then advantageous for reasons of economy to employ only the apparatus necessary to perform the range of operations involved and the present system is adequately flexible to accommodate itself to each application as desired.

In addition to these changes since it is desired to obtain the final result to the nearest cent, means are used to arbitrarily add one-half cent or five mills in column 2 but no final result is displayed in this column. This is a well-known method of rounding off figures in which the carry may or may not be produced but this arbitrary five shows up in the next higher order column as the correct result to the nearest half cent. This is indicated by the figure 5 which is shown in the carry line in column 2 in Fig. 5a.

Fig. 5 shows the problem presented in Fig. 4 rearranged in accordance with the pattern of Fig. 5a and incidentally shows how the value was rounded off to the nearest full cent by arbitrarily adding five to the second column and not recording the units part of the addition but using only the tens part of the addition as a carry to column 3. That is, the digit 3 appearing as the carry in column 3 represents the tens portion only of the sum of the digits in column 2 including the arbitrarily added digit 5 in the column. It will be seen that the final sum in Fig. 5 is the value of the precise total of Fig. 4 to the nearest half cent disregarding the values that might exist in column 1 and column 2. Here again, however, the error will not exceed two-tenths of a cent. In any case where a precise total is required, the system is fully adapted to furnish such totals in as many decimal places as required by the addition of corresponding components throughout to perform the necessary steps.

Precomputed multiplication table

Figure 6:
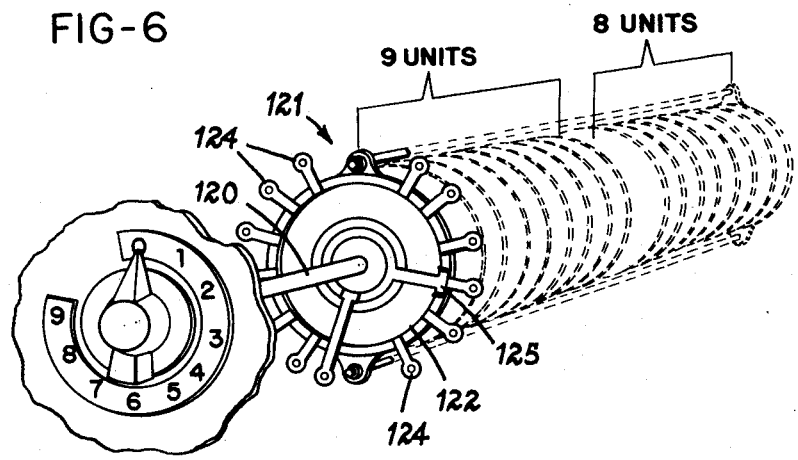
Fig. 6 is a perspective view of one of the manually operated rotary selector switches for setting in the price per pound.
Figure 7:
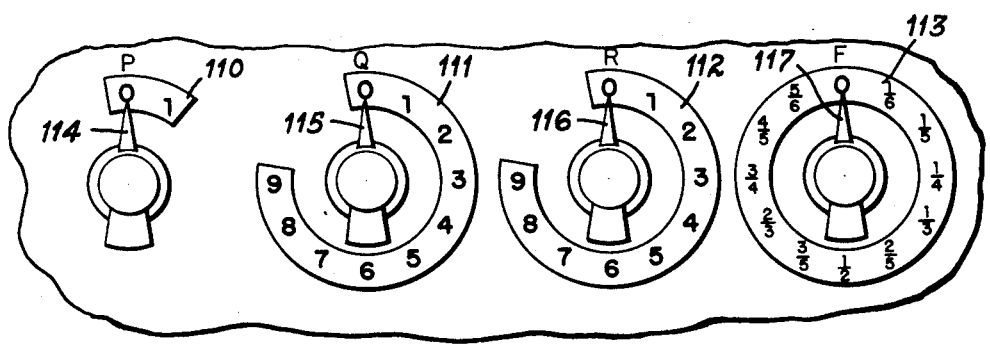
Fig. 7 is a schematic view of the series of selector switches of Fig. 4.

Multiplication is accomplished in accordance with the present system through the use of a precomputed table of electrical circuits, the more detailed construction and operation of which are as follows. One factor, such as the price per pound in the case of a computing scale, is set into the machine by means of a series of manual controls each having a dial 110–113 marked with suitable designations, and pointers 114—117, each of which may be set separately representing for example dollars, dimes, cents and fractions of cents per pound, and further identified as P, Q, R and F respectively. Reference is made to Figs. 6 and 7 showing such dials each of which is mounted on a shaft 120 and arranged to actuate a rotary selector switch indicated generally at 121 which comprises a number of similar contact carrying disks 122 each having stationary contacts 124 thereon which are arranged to be selectively engaged by rotary contact 125, movable with shaft 120 as its pointer is turned. Suitable detent mechanism is provided to center the position of the rotary member so that in any position of rest, movable contact 125 will come to rest upon one of the stationary contacts 124. As indicated in Fig. 6 there are two groups of such switch disks arranged with 9 in the first bank representing a units portion, and 8 in the remaining bank representing a tens portion. There is a similar arrangement for each of the P, Q, R and F switches.

Fig. 8 represents diagrammatically the circuit connections established by one of the rotary selector switches 121 in response to the manual setting thereof at a desired position. There is a units section at the top and a tens section at the bottom of the drawing. At the left are two series of movable switch contacts 125 arranged to travel as a group toward the right and be stopped manually when they are at the position corresponding to the price per pound. Thus each digit of the factor P, Q, R, F has such a circuit and is separately set by its pointer, the circuits for the Q and R switches being identical, with the circuits for the P and F switches being different for the reasons already discussed.

The other factor is selected by choosing the level of the group of contacts to be energized. There is a fixed contact at each level for every one of the positions of the movable contact assembly. The tens section physically duplicates the units section, it being understood that the rotary contacts traverse the numbered positions in both the units and tens sections together. Corresponding ones of the movable contacts in the units and tens sections are not however necessarily chosen to be energized together since they are activated by different factors of the weight.

In the system herein described the stopping of the weight stepping switches W, X, Y and Z in their respective positions preconditions the appropriate circuit to effect the selection of the proper level in the table to represent the input of that factor in the product, it being understood that the system produces partial products of each digit of one factor by the separate digits of the other factor in proper sequence and column position. It will also be understood that either set of contacts may be fixed and the other movable.

Each fixed contact has a digit associated therewith which corresponds to the product of the particular number associated with the movable switch in that level multiplied by the digit at the top of that column. Where the product of those numbers is 10 or higher, the units portion only is found in the upper or units section of the diagram with the tens portion being found in the lower or tens section of the diagram only. For example, the movable contact in the 7 level when advanced to the fifth column shows the digit 5 applied to the contact in the units section and the digit 3 applied to the contact in the tens section, 35 being the product of 7 times 5.

Reference to Fig. 5a will indicate that it is necessary to arrange partial products in the same column which represent both units and tens digits of the products of the different factors. For example, column 4 of Fig. 5a includes a tens portion of the product of Y times Q and a units portion of the product of X times Q. Further, the same column includes the tens portion of the partial product of X times R, as well as the other partial products there shown, thus requiring the combining in the proper manner in columns of the same value of partial products from the output circuits of units and tens sections respectively of both the same and of different selector switches, as described below.

Thus in Fig. 6 while the units and tens section of a particular factor of the price are mounted on the same shaft so as to be connected mechanically and set simultaneously they are electrically separated because at any one time the tens section and the units section will be operated in conjunction with adjacent factors, rather than the same factor, of the weight.

This precomputed multiplication table has an output circuit a portion only of which is shown in Figs. 10 and 10a which represent the conditions and circuits established when the movable contacts 125 occupy two alternative positions, namely, the 2 position and the 7 position. The two columns of contacts carry the same numerals as the corresponding columns in Fig. 8 in both the units and tens sections.

Connections are made from the contacts of each column to a terminal board comprising a units section 130 and a tens section 131. Both sections of the terminal board contain the necessary number of terminals numbered sequentially, and every contact in the individual columns of the table is cross-connection directly to its correspondingly numbered terminal. Thus in column 2 for example the lowermost contact in the units section is connected to terminal 2, and so on throughout the entire sequence. It will be noted that the lower contacts in the tens section are left open in Fig. 10, representing values of less than 10. It will be understood that the entire series of the 9 columns in Fig. 8 are so connected to their respective terminal boards which thus constitute the output circuits in which the units and tens portions of the several partial products appear at positions corresponding to their numerical value. It will be understood that the several selector switches are connected to the precomputed tables and to the several output circuits in accordance with the pattern of Fig. 5a in order to provide for associating partial products in columns of the same value. Rectifiers or blocking diodes 134 are used in each connection to prevent improper operation and short or sneak circuits.

The three rotary selectors having pointers 114, 115 and 116 representing dollars, dimes and cents may be the same as that described above at 121. However for limited range purposes such as are adequate for a computing scale of the type herein described it is not necessary that the switch providing for the setting of dollars per pound have a full range of positions. Thus it may suffice for practical purposes for this switch to have only two positions, corresponding to 0 and 1, respectively. Furthermore since the resultant product can never exceed 9 where one factor is 1, it is not necessary to have a tens section for this switch, and accordingly it is sufficient for it to comprise only the 9 decks in the unit series. It will be understood however that this range may be extended as may be desired by following the same technique as with the other switches.

Referring now to the selector switch having pointer 117, this switch differs in the following respects in that for the purposes of the present application it is desired to provide a 0 position and 11 fractions rather than a 0 position and 9 units. Thus this switch has 12 positions as opposed to 10 positions in the switch as described above. In all other respects, this switch is similar in construction and operation, and the table of values represented in the composite drawing is worked out on the same basis as that described above with respect to Figs. 8, 10 and 10a. Since however this multiplication table involves a series of fractions, the table of products is arbitrarily rounded off to the closest value expressed in two digital positions in each instance.

In order to transfer the multiplying result from the respective terminal boards 130 and 131 of the output circuits for use in the remainder of the system, use is made of a group of four relays. These relays are assigned values of 1, 2, 3 and 5, respectively, although it will be evident that different values may be used, the present system being described for illustrative purposes. Accordingly, the digits 1 through 9 may then be represented in terms of the operation of one or more of the relays in accordance with the following table:

| Digit: | Relay operated |
|---|---|
| 1 | 1 |
| 2 | 2 |
| 3 | 3 |
| 4 | 3+1 |
| 5 | 5 |
| 6 | 5+1 |
| 7 | 5+2 |
| 8 | 5+3 |
| 9 | 5+3+1 |

Figure 11:
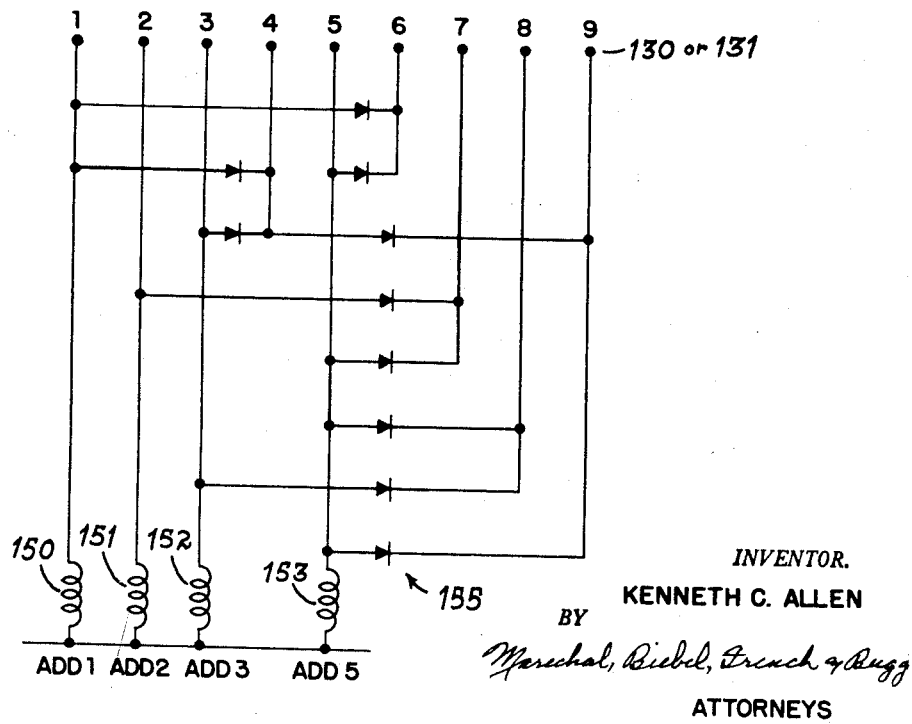
Fig. 11 is a view of the output circuit of the multiplying table.

Selective operation of each relay from its associated terminal board is accomplished as shown in Fig. 11 by connecting the terminals in the pattern set out immediately above. Thus contact terminals 1, 2, 3 and 5 connect directly with separate relays 150, 151, 152 and 153 respectively. Terminal 4 and each of the remaining terminals is connected to two or more relays, and for the purpose of preventing unwanted or improper operation, each of the circuits containing two or more relays includes rectifiers 155 so that only the desired combination of relays will be operated in response to application of voltage to a selected one of the terminals.

Relay 150 is considered as the "Add 1" relay, 151 as the "Add 2" relay, 152 as the "Add 3" relay, and 153 as the "Add 5" relay.

Selection of digits for addition

Reference is now made to Fig. 9 which shows the complete set of circuits controlled by the weight read-out switches W, X, Y and Z. Each of these switches has a number of decks, including the first deck shown at the top and marked $w$, corresponding to the 1 column in Fig. 3. Each switch also has a second deck indicated as $w+1$, corresponding to the deck marked 2 in Fig. 3. Switches W, X and Y in addition have a deck indicated as $w-1$, which corresponds with deck 3 in the lower part of Fig. 3. The deck marked S in Fig. 9 is that used to provide the sensing of the position of its wipers, corresponding to the decks marked 4 in Fig. 3.

The remaining decks are marked with designations of the partial products corresponding to those shown in Fig. 5a. Inspection of Fig. 5a shows that PU and QT for example work in pairs cooperating with Z in column 3, Y in column 4, X in column 5 and W in column 6. Likewise QU and RT are paired as are RU and FT. The FU designations work by themselves and hence do not require rectifiers because they cannot be short circuited by another section. Again inspection of Fig. 5a shows that PU and QT must cooperate with all four digits W, X, Y and Z, whereas FU must cooperate only with digits W and X. To effect this combination switch Z is provided with two additional decks, one designated as PU QT and the other designated as QU RT (Fig. 9). Switch Y is provided with three additional decks, two having the same designations as those just described for Z and an additional deck designated as RU FT. Switches W and X are provided with four additional decks for the accommodation of all four possible combinations. To these groups of identically designated switch decks is connected one nine wire cable going to the 1 to 9 position of all decks. There are four of these cables in all which carry the designations PU QT, QU RT, RU FT, and FU indicated diagrammatically in Fig. 9 and shown more fully in the composite drawing Figs. 21–42. These cables are connected to the selector switches 121 in the manner indicated, the QU RT cable for example connecting to both the units section of the Q selector and the tens section of the R selector.

To provide the digits for any one column it is only necessary to ground or energize the proper wipers in the W, X, Y and Z switches. Thus to add column 2 (Fig. 5a), the QU RT wiper of the Z switch, the RU FT wiper of the Y switch and the FU wiper of the X switch will be grounded or energized. This in turn causes the operation of one or more of the Add 1, Add 2, Add 3 and Add 5 relays as shown in Figs. 12 and 13 and provides the digits in column 2. Similarly through the grounding of others of the wipers in accordance with the sequence shown in Fig. 5a, digits are likewise provided for each of the remaining columns.

Method of addition

Referring now to Fig. 12, there is shown diagrammatically one of the addition circuits which cooperates with a single one of the terminal boards, 130, or 131, of a selected one of the manual selector switches, and provides for adding the partial product to another partial product of the same order, each a step in the summation of one column in the multiplying operation. The circuit of Fig. 12 will be clear from inspection. Thus assume that terminal 1 of Fig. 11 has been energized, causing relay 150 to be actuated from its unenergized or up position as shown, to its energized or down position. This relay has six poles, the first five of which are designated 0 through 4, and one of which will be energized in the operation of the system. Tracing of the circuits will show that the incoming wire designated 0 will be transferred to the 1 position upon the energization of relay 150.

If for instance the wire designated 2 is energized and none of relays 150—152 is energized, then that energized circuit follows through leaving the relay bank with the same wire energized. If for example relay 150 is energized, however, then the 2 wire will then be energizing the 3 wire on the output side of the relay. Without further detailed analysis it will be evident that selected additions of 1, 2, 3 or a combination thereof may be made as desired.

At the right-hand side of Fig. 12 there is illustrated the first relay 150 of the next succeeding bank of relays, and the connections between the banks are shown by means of which another desired addition may be effected from a similar terminal board having a value impressed from the same order of values. In the composite system there are seven such relay banks similarly connected.

The system of addition employed in the present arrangement is different from the ordinary decimal system in that digits are added from 0 to 4, and the fives are handled separately. That is, above 4, the system adds five as a unit.

Referring again to Fig. 12 and more particularly to the Add 1 relay 150, it will be noted that if the relay remains unoperated with the 4 wire energized the 4 wire leaving the relay will be energized; but if the relay operates, the wire designated 0 leaving the relay will then be energized. This terminal is connected through rectifier 158 to the sixth or bottom pole of the relay, and in the operated condition, the circuit is then established through line 160 to the "Carry 5" relay shown more particularly in Fig. 13.

The Add 1 relay is called upon to carry a 5 only when it receives an input on the 4 wire. However the Add 2 relay must be capable of operating the Carry 5 relay when it receives an input on either the 3 or 4 wire. Likewise the Add 3 relay must provide for the actuation of the Carry 5 relay when any one of its 2, 3 or 4 wires is energized. Analysis of the circuit diagram of Fig. 12 will show that this result is provided for, whereas in the present case the Add 2 and Add 3 relays are not required to operate simultaneously.

Referring now to Fig. 13, there is shown the initial portion of a summation circuit associated with the Add 5 and Carry 5 relays. The series continues as a repetition of the circuits of the last two relays indicated; and for purposes of analysis, therefore, only the first six relays in the system will be described. They are designated 170 through 175 inclusive. Relays 170, 172 and 174 are the Add 5 relays of the various banks referred to above. The Add 5 relays are operated directly from the terminal boards 130, 131, respectively, of the multiplying table. Relays 171, 173 and 175 are the Carry 5 relays which are operated by the adding functions of relays 150, 151 and 152 as just described. This group of relays is wired in the familiar tree or branch circuit wherein at the end of the series a certain wire will be energized which will be indicative of the number of relays which have been operated regardless of their position in the series. For instance out of the six relays shown if only two of them are operated the number 2 wire at the right-hand side of the diagram will be energized. If four are operated, regardless of which four, the 4 wire will be energized. The particular range of multiplication which is effected in the present apparatus requires simultaneous operation of a maximum of nine of these Add 5 or Carry 5 relays and normally the series would be continued on up to a point where ten pole relays were required. For purposes of economy and simplification this system again adds only 0 through 4 and when an additional digit is added to the four the 0 wire again becomes energized as does another wire which represents a Carry 5 of these units of five. This is shown in connection with relays 174 and 175 wherein the sixth pole energizes a Carry Transfer relay if the condition is such that the 4 wire of the series was energized on arriving at that point.

Addition of columns

The adding process for the partial products in any one column will now be described to illustrate how a typical column of numbers is added and the carry provided for the succeeding column.

Referring now to Fig. 12 it will be assumed that the 0 wire to the right of the diagram is energized or grounded as the case may be. Fig. 12 represents the Add 1, Add 2, and Add 3 relays for one digit and in this particular system provision is made for the adding of 7 digits. This is because 7 digits is the largest number required to be added with factors which fall within the range of those used in a commercial weighing and computing operation. It will be understood, however, that there is no inherent limitation on the number of digits which may be added, and that by merely adding additional components similar to those described, the system may be made to accommodate as many digits for addition as may be required.

In accordance with the particular wire entering the multiplication table which is energized, relays in any one group may be set up to add 0, 1, 2, 3 or 4 as previously described and this applies to all 7 groups. Thus one of the five wires leaving the last relay of this series of twenty-one will be energized. This wire will represent the sum of all of the digits in this particular column exclusive of the fives and obviously will indicate only the digits 0 through 4.

Simultaneously the Add 5 relays which are shown in Fig. 13 have been operating in conformance with the magnitude of the figures to be added and the Carry 5 relays in accordance with the sum of the figures which have been added by the twenty-one relays just discussed. Again five wires will leave the last one of this group of relays and one of these wires will be energized in accordance with the number of fives in the summation of the column but again exclusive of the number of twenty-fives, that is, five of the units of five.

If the number of fives entered into the last described circuit is five or more then the Carry Transfer relay will operate through the connection as shown on Fig. 13.

In Figs. 14 and 42 is shown a five-pole double throw Carry Transfer relay designated as 190. The five wires entering this relay are those coming from the last relay in the series of fourteen used for adding fives. If the Carry Transfer relay is unoperated, then it is obvious if the #3 wire entering the relay is energized the #3 wire leaving the relay is also energized. If however this relay 190 is operated then with the #3 wire energized upon entering the #8 wire would be energized on leaving. In a similar manner the 0 wire would become the #5, the #1 wire a #6; this relay thus has the effect of adding five to the output of the series of Add 5 and Carry 5 relays.

Looking now at the ten wires leaving relay 190 it will be noted that the odd numbered wires are connected through rectifiers 191 to the Value Transfer relay 192 in such a manner that if an odd wire should be grounded then relay 192 will operate. In the same manner that relay 190 operates relay 192 serves to add 5 to the result of the series of twenty-one relays previously designated as Add 1, Add 2, and Add 3. Thus should the summation of the one column have been 29 for example the #4 wire entering relay 192 will be energized and since twenty-nine represents 4+25 which in turn is 4+(5×5) then the chain of Add 5 or Carry 5 relays will be energizing the 0 wire entering relay 190 and the 5 wire leaving the relay 190. Since the 5 is an odd number this will energize relay 192 and change the 4 which entered relay 192 into a 9 leaving it, thus giving the correct units part of the summation.

This circuit thus converts the partial products from a series of decimal numbers arranged in columns to a code based on use of one or more of the numbers 1, 2, 3 and 5, adds the coded numbers on a quinary basis, and obtains the sum of the lower order column in the form of a number of quinary carries plus the digits 0, 1, 2, 3, or 4, the number of pairs of quinary carries being transferred to the next higher column for summation in that column, leaving in the lower order column the odd quinary carry if such is present to be added to the other digits in forming the final definitive digit for that column as a decimal number.

The next step is to effect the recording of the summation so produced, and in accordance with this system the 9 or units portion of the number is to be recorded and the 2 or tens is to be carried to the next column. That is, the 9 is a significant figure to be recorded while the 2 must be carried to the next position.

Figure 15:
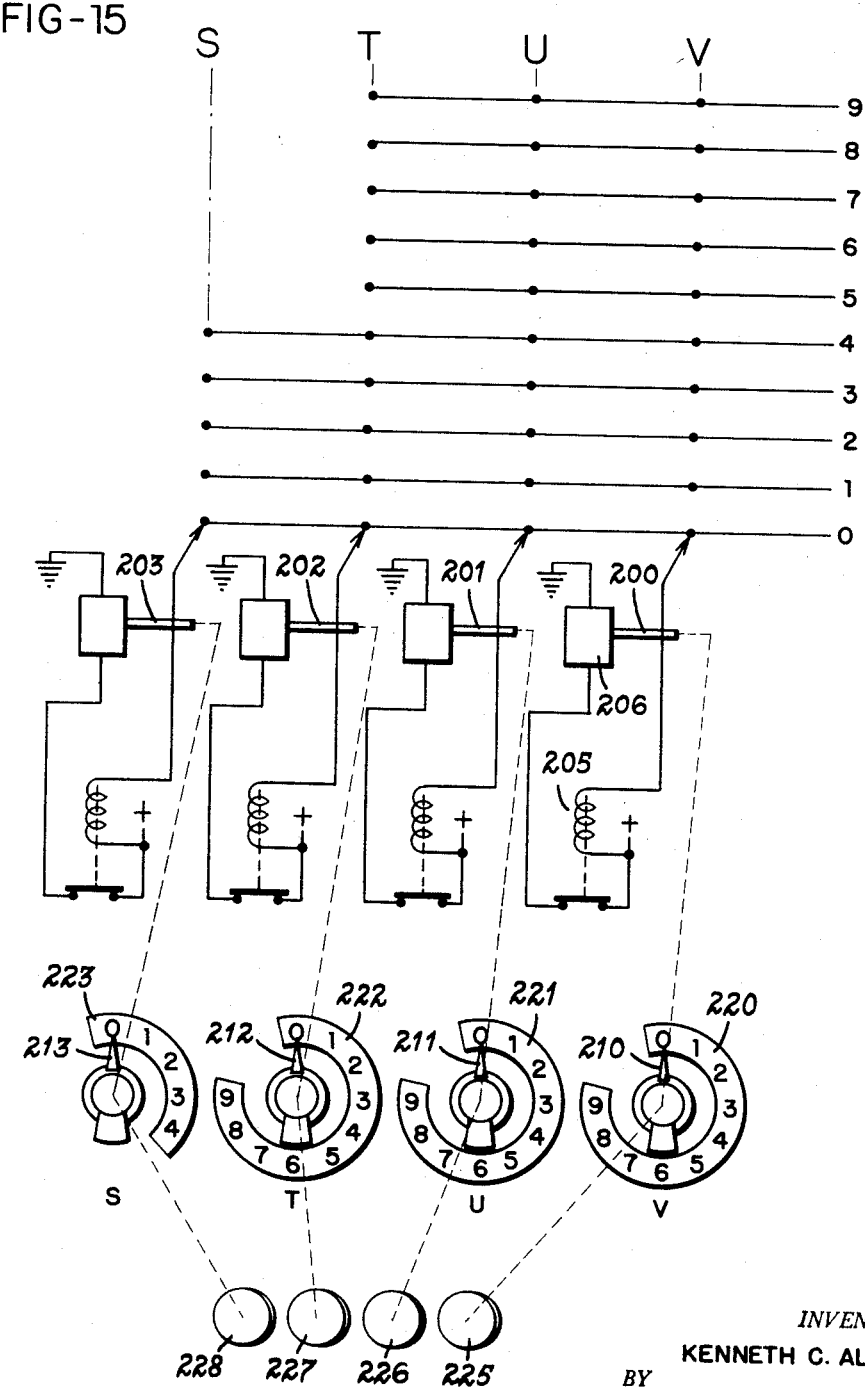
Fig. 15 is a view of the selector switches which actuate the indicators and printing mechanism for recording the final output in terms of price.

Referring now to Fig. 15 there are shown four stepping switches 200, 201, 202 and 203. The wires entering these stepping switches come from the Value Transfer relay 192 and are numbered similarly 0 through 9. In accordance with which column of the problem is being added at the time, that is, the tens, units, tenths, or hundredths, the stepping switch representing that column will be energized and will operate until it has found the grounded wire coming from relay 192. At this point its control relay 205 operates to deenergize its driving mechanism 206 and the switch stops in a position indicative of the grounded wire. In the example just discussed this would be in position 9, and this would furnish an indication of that portion of the final product. This is indicated in Fig. 15 by the series of dotted line connections which couple the stepping switches 200—203 with the series of pointers 210—213 on indicating dials 220, 221, 222 and 223, respectively, on which there is thus produced an indication of the final product. These dials are further marked S, T, U and V and in the present case read tens of dollars, dollars, dimes, and cents, respectively. Similarly, extension of the dotted connections to a series of type wheels indicated at 225—228 provides for similarly setting the position of these wheels, so that they are in position to properly print the value upon a ticket or the like.

Figure 16:
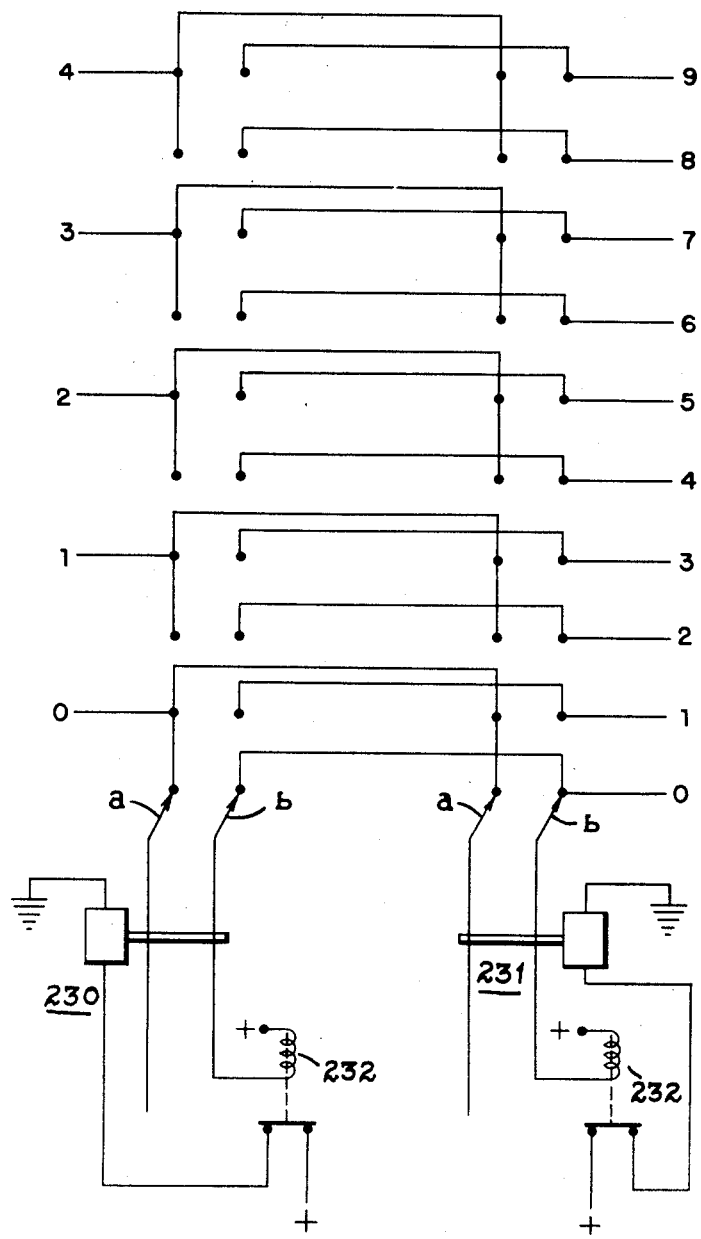
Fig. 16 is a view showing a portion of the carry registers.

In order to provide for the tens portion of the column and for carrying it into the next succeeding column, the mechanism indicated in Fig. 16, is provided comprising two 2-level stepping switches 230 and 231 which are connected in parallel, each having a control relay 232 as shown in Fig. 16. However in the composite drawing only a single such relay 232 is employed. The entering wires numbered 0 to 9 are those coming from the Carry Transfer relay 190. These wires are indicative of the number of fives in the summation of the preceding column and it is now necessary to convert this to the number of tens and store that information for use during the next summation. Stepping switches 230 and 231 alternately perform identical functions.

Assume that at this time relay 230 is connected so as to operate, which it will do until its wiper *b* which is connected to control relay 232 finds the grounded one of the wires numbered 0 to 9 at which time relay 232 will operate and stop the operating motor of relay 230. It will be noted that if its wiper *b* stops on the #5 wire for example, wiper *a* of switch 230 is then connected to outgoing line #2 in the series of wires numbered from 0 through 4 at the left-hand side of the diagram. If this wiper *b* of relay 230 had stopped on line #4, its wiper *a* would still be connected to the #2 wire. This arrangement serves the function of converting the number of fives to equivalent tens. When stepping switch 230 has come to rest at its proper position and the associated stepping switch shown in Fig. 15 has also come to rest in its corresponding position, then the conditions are changed so as to ground wiper *a* of switch 230 and set up switch 231 to do a similar operation for the next column. The wires 0–4 of the left-hand series leaving Fig. 16 are connected to the right-hand wires in Fig. 12 and the grounding of wiper *a* of switch 230 provides a carry entry into the series of adding relays indicated on Fig. 14. During the next adding operation switch 231 takes the place of switch 230, will find the grounded wire upon the completion of that addition and its wiper *a* will later be grounded to provide the carry for the next column. In other words these two switches 230, 231 perform duplicate operations for alternate columns for the reason that one must provide the carry entry of the column while the other simultaneously reads out the carry result of that column.

Referring again to the example where it is assumed that one column would add up to a total of twenty-nine, it was explained that this would show as an energized 4 wire entering the Value Transfer relay 191 and would also consist of five units of fives leaving the Carry Transfer relay 190. Because the number of fives were odd the Value Transfer relay would operate and change the 4 into a 9. It will be seen from the discussion of the operation of switch 230 that when it has come to rest upon the 5 wire its left-hand wiper *a* is energizing the 2 wire which is the tens part of the twenty-nine used in the example and it is to be carried into the next column. Thus the twenty-nine is made up of a 4, an odd 5, producing a 9 in the first column while the next lower even number of fives (i.e. 4) have been converted to an equivalent number of tens, resulting in a 2 in the next column.

*Sequence of operation*

Sequential mechanism is provided for causing the system already described to go through the entire series of operations in the proper sequence, obtaining the partial products, performing the same series of additions and obtaining the same result for each digit of the final product as has just been described in connection with Figs. 4a and 5a. In addition it is necessary to provide for reading out the position of the scale when the scale has come to rest at the end of each weighing operation, and introducing that factor into the system to constitute the weight element in the computation. All of this control of the sequential operation is accomplished by means of the ten level rotary sequence selector shown at 250 in Fig. 17 having 19 operating positions. It will be noted in the drawing that wipers 1, 2, 3, 4, 7, 8, and 10 are connected to the negative side of the power supply. Wiper 5 is connected at common point 85 to the positive side of relay 77. Wiper 6 is connected to the lower end of relay 77 and wiper 9 is connected to the lower end of relay 232. These two relays serve the functions of controlling stepping switches which are shown in Figs. 3 and 4. Relay 232 controls only the two stepping switches 230 and 231 which in Fig. 16 read out the number of fives to provide the carries for succeeding columns. Relay 77 controls the four stepping switches represented in Fig. 3 which are set in accordance with weight responsive wipers 33, 45, 55 and 56 and also controls the four stepping switches 200—203 shown on Fig. 15 which read out the value columns S, T, U, and V.

As described above in connection with the stepping switch circuit Fig. 3, in which several relays 77 are shown in association with the several switches for purposes of illustration, in the preferred form of the system only a single relay 77 is used, being connected to function successively in relation with the several stepping switches W, X, Y, and Z with which it is associated.

Figure 17:
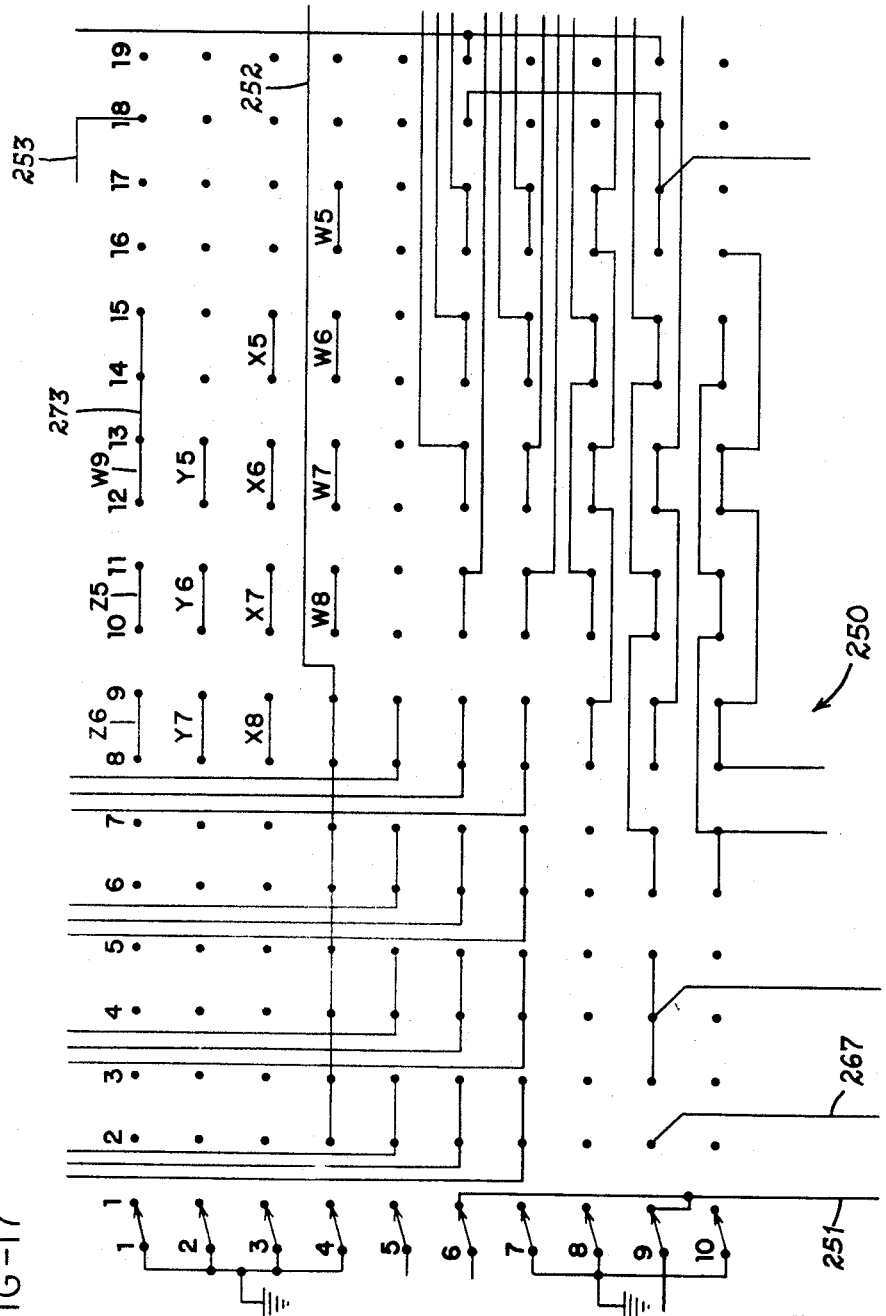
Fig. 17 is a diagrammatic showing of the sequence mechanism.

The wiring of relay 77 is such that when it is in the unoperated position it furnishes positive power to its associated stepping switches, and such stepping switch will operate providing it is simultaneously receiving a negative source of power from the control sequence selector 250 of Fig. 17. Relay 77 is also wired in such a manner that when it operates not only does it stop its respective stepping switches with which it is then associated, but when both relays 77 and 232 are simultaneously operated through a series circuit they cause sequence selector 250 to operate. This provides an interlock such that selector 250 cannot operate when any of the other stepping switches is operating nor can these stepping switches operate when selector 250 is in operation.

The normal or home position for selector 250 is on the 1 row. At this point wipers 6 and 9 which go to relays 77 and 232 respectively are connected to wire 251 through which a temporary ground is effected when the scale has reached its balance position with a weight on the platter, suitable switch mechanism being associated with the weighing system as described in said copending application Serial No. 376,136 for accomplishing this result, namely the Control relay C thereof.

This ground on wire 251 causes the operation of both relays 77 and 232 which in turn apply power to selector 250 and it advances to position 2. In this position wiper 9 of selector 250 is grounded which maintains relay 232 in an operated position through line 267. Wiper 6 is now connected to wiper 1 of the Z-switch 72 of Fig. 3 and wiper 5 is connected to wiper 2 of the Z-switch 72 in Fig. 3. Furthermore, wiper 7 which is grounded is now connected to the operating motor of the Z-switch 70 in Fig. 3 and under these circumstances the Z-switch will run in the manner previously described. When the Z-switch has progressed to the point where its wiper 1 is grounded and wiper 2 is not grounded, relay 77 will operate thus turning off switch Z and since relay 232 is already operated this further operation of relay 77 will cause selector 250 to advance. At this time selector 250 will progress from its position 2 to position 4. In this position relay 232 is still operating because of the continued ground on wiper 9 and the advance of wiper 7 from position 2 to position 4 now sets up a new set of conditions in which the operating coil of switch Y of Fig. 3 is now grounded. Wiper 6 is now connected to wiper 1 of switch Y and wiper 5 of selector 250 is now connected to wiper 4 of switch Z.

As previously described, wiper 4 of switch Z is connected to wiper 2 or 3 of switch Y dependent upon the position of switch Z. Thus in effect switch Y is now connected to wiper 2 or 3 of switch Z. Thus in effect switch Y is now connected to operate and will do so until its wiper 1 finds a ground and its wiper 2 or 3 according to the setting of switch Z simultaneously finds an ungrounded point, all as described in more detail above. This will cause relay 77 to operate thus turning off switch Y and cause selector 250 to advance to its 5 and immediately to its 6 position. At this point identical conditions are set up in switch X and switch X operates. However, at the same time wiper 9 of selector 250 now connects relay 232 to wiper b of switch 231 of Fig. 16 and wiper 10 grounds the operating motor of switch 231 thus causing switch 231 to operate simultaneously with the operation of switch X. Since at this point there is no adding process taking place the zero wire (Fig. 16) will be energized and switch 231 will come to the zero position preparatory to entering a zero as the carry into the first column to be added.

When both switch X and switch 231 have arrived at their proper positions, relays 77 and 232 are operated and selector 250 advances to its 8 position. Here the conditions previously described for Z, Y and X are set up for switch W and the conditions just described for switch 231 are set up for 230. Furthermore, wiper 8 now grounds wiper $a$ of switch 231 and since wiper $a$ has just been operated to its zero position this furnishes a zero entry into the series of adding relays shown on Fig. 12. During the entire operation up to this point wiper 4 has caused lead 252 to be grounded. The grounding of this wire has caused the operation of the first Add Five relay shown in Fig. 13. This relay remains operated in positions 8 and 9 and thus serves the purpose of adding the arbitrary five shown in column 2 of Fig. 5a. Gounded wipers 1, 2 and 3 of selector 250 now simultaneously ground wipers FU, RUFT, QURT of switches X, Y and Z, respectively, for the purpose of entering and adding the partial products of column 2.

As previously described wipers 9 and 10 are now in a position to cause selector 230 to operate which it does until it finds the grounded wire representing the tens component of the sum of this column. Since in the example described it is not desired to record the units part of this adidtion, switch 230 reads out the number of pairs of fives converted to equivalent tens and provides a carry for column 3, namely, $K_3$, as shown in Fig. 5a. Simultaneously conditions previously described for switches Z, Y and X have been set up for W so that the W switch is operated to read out its digital part of the weight. This simultaneous operation is possible because the W factor does not appear in column 2 of addition. When both W and switch 230 have found the grounds so established, relays 77 and 232 close causing selector 250 to operate until it reaches its 10 position. At this point the functions of the carry switches 230 and 231 are again reversed so that wiper $a$ of switch 230 is now grounded furnishing $K_3$ to the adding switches of Fig. 12 and switch 231 is conditioned to operate to read out the tens portion of the sum of column 3. Wipers 1, 2, 3 and 4 of selector 250 now ground the wipers on the correct decks of switches W, X, Y and Z so as to set up the partial products called for in column 3 in Fig. 5a.

Wiper 6 of selector 250 is now connected to the wiper of switch V (Fig. 15) and wiper 7 now grounds the operating coil 206 of switch V so that switch V is conditioned to run until it finds a ground in accordance with the units portion of the summation of column 3 in the manner previously described. This provides the pennies portion of the final product. As already described, the indicator dial is set to show the proper digit, and at the same time the type wheel 225 is correspondingly set. Likewise the proper input is made to the register.

When switch V and switch 231 have both found their grounds, relays 77 and 232 are again operated stopping these two switches and causing selector 250 to advance to its 12 position where the process is again repeated. This time conditions are set up to obtain the partial products shown in column 4 (Fig. 5a) the reversal of the functions of switches 230 and 231 provides the carry for column 4 designated as $K_4$ in Fig. 5a and to read out the resultant tens to provide for the carry $K_5$ in column 5. This time the relays and power supply are connected to switch U (Fig. 15) and this operates in the same manner as just described for switch V, producing proper designations for the dimes portion of the final result.

Without further detailed analysis it will be clear that as selector 250 advances through its 14 and 16 positions respectively the same sequence of operation will occur, resulting in the proper setting of the T and S digits, representing the dollars and tens of dollars portions respectively of the final product.

In this last operation however there is no carry required for succeeding columns so that the 9 wiper of selector 250 leading to relay 232 has again been grounded and when stepping switch S in Fig. 15 reaches its proper position, relay 77 again closes and selector 250 advances to its 18 position where wiper 1 grounds wire 253 (Fig. 18) which is connected to relay 254 the operation of which causes a printing or a registering cycle to take place. Since in this 18th position wipers 7 and 9 are both grounded the selector passes on by the 18 position to the 19 position so as to avoid a recurring of the printing or registering operation. Upon completion of the printing cycle the cam 255 which is a part of the printing mechanism causes the grounding of wire 256 which through selector 250 again causes both relays 77 and 232 to operate which in turn cause selector 250 to advance from its 19 position back to its starting point thereby completing the cycle. In this manner selector 250 is prevented from starting a new cycle of operations until the printing has been completed.

Selector 250 is prevented from recycling and also accomplishes certain other functions in a manner as now will be described.

Non-repeat

Temporary grounding of wire 251 which causes selector 250 to move from position 1 to position 2 is produced by the weighing mechanism which temporarily closes a circuit to terminal C as described above, by wire 257 through its contacts 258, 258a on relay 260 (Fig. 18) which is operated at that time. When selector 250 moves to its 2 position its wiper 2 grounds the positive end of the operating coil of relay 260 through connection 259, the voltage being dissipated through resistor 263 causing relay 260 to open. The opening of relay 260 breaks the self-locking connection effected between its contacts 261 and 262 so that it will not again be closed until wire 264 is grounded in response to removal of weight from the platter of the scale. Wire 264 leads to terminal N which in turns connects to a switch forming part of the scale which closes only when the weight is removed from the scale—such as the No Load relay N as disclosed in said application Serial No. 376,136. Thus even though wire 257 may be grounded upon completion of the cycle as it was at the start of the cycle, wire 251 will not be grounded, due to the opening of switch 29 and selector 250 will not make an improper repeat operation.

Furthermore the opening of relay 260 closes contacts 262 and 265 which ground the terminal of the indicator light 266 which is a signal to the scale operator that the load has now been weighed and may be removed and a new load placed on the platter. This removal of the load at this point even though the weight registration has not been completed will not cause a change in the position of the weight read-out mechanism because in this 2 position wiper 4 has grounded wire 252 which action not only caused the operation of the Add 5 relay previously described but also operates a relay (not shown) in the weight control mechanism through terminal M to prevent operation of the scale by disabling the motor control relays U and D in the circuit shown in said co-pending application Serial No. 376,136 until that wire again becomes ungrounded, indicating that the read-out of the weight has been completed. Since some time is required for relay 260 to release and the selector 250 should not leave position 2 until that has taken place, the wire 267 from contact 265 returns to selector 250 and in the 2 position thereof is connected to relay 232. As was previously pointed out selector 250 cannot operate until both relays 77 and 232 have operated so that this serves to delay the operation of selector 250 until relay 260 has definitely been released.

Time sharing

It will now be apparent that the invention makes it possible and practical for the system as a whole to carry on different operations simultaneously on different loads, with different portions of the system thus sharing the same time and thereby contributing to speed of operation but without sacrificing accuracy. Thus as soon as the indicator light 271 is energized by opening of relay 270 as just described, the scale operator is informed that the scale motor 20 has been deenergized to hold the shaft 23 in its proper position corresponding to the balance position of the lever 13, and that the load on the platter 10 can therefore be replaced by a second load without affecting the reading of the weight of the previous load. The lever is accordingly then free to be deflected in the proper direction depending upon whether the second load is heavier or lighter than the first which has just been weighed while the read-out of the previous weight is still being taken and transmitted to the computer. The read-out is completed when the selector 250 reaches its 10 position as described, and at that point the ungrounding of wire 252 provides for reenergizing of the motor 20 in accordance with the further deflection of the lever. The motor 20 can therefore drive the follow-up system to the appropriate new position of the shaft 23 for the second load while the computer is completing its computing operation for the first load and the printer is printing the correspondingly appropriate record.

Protective features

Relay 270 is provided as a safeguard against improper operation due to a temporary failure of the source of power or an attempt to effect a complete cycle of operation when the scale is either in a position below 0 or a condition representing an overload, in both of which cases it is desired to prevent the printing of a ticket and operation of the registering mechanism which under these conditions would provide an incorrect result.

It will be noted that the printing relay 254 receives the positive side of its power supply through the upper set of contacts on relay 270 only when that relay is operated and that the lower set of contacts on relay 270 provide a self-locking circuit. When the main power supply is first turned on or after any failure of power, relay 270 will be open and the printing operation cannot take place. Furthermore the opening of relay 270 through its lower set of contacts puts a ground on indicator light 271 which notifies the scale operator that the reason why the ticket has not been issued is because there has been an error or defect or some kind. When selector 250 advances from its home position 1 to its first operating position 2, relay 270 is closed by the grounding of wire 272 through the 1 wiper of selector 250. Thus this relay will be closed at the start of every operation. If power failure should occur aftere selector 250 has left the 2 position, relay 270 will open and function as just described and the printer or register cannot operate until the next cycle.

Figure 19:
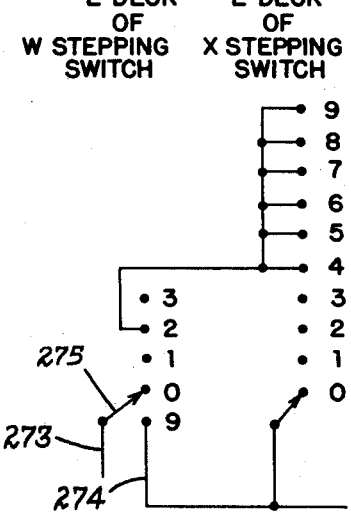
Fig. 19 is a further schematic showing of the mechanism for preventing operation when the scale is outside its proper range.
Figure 21:
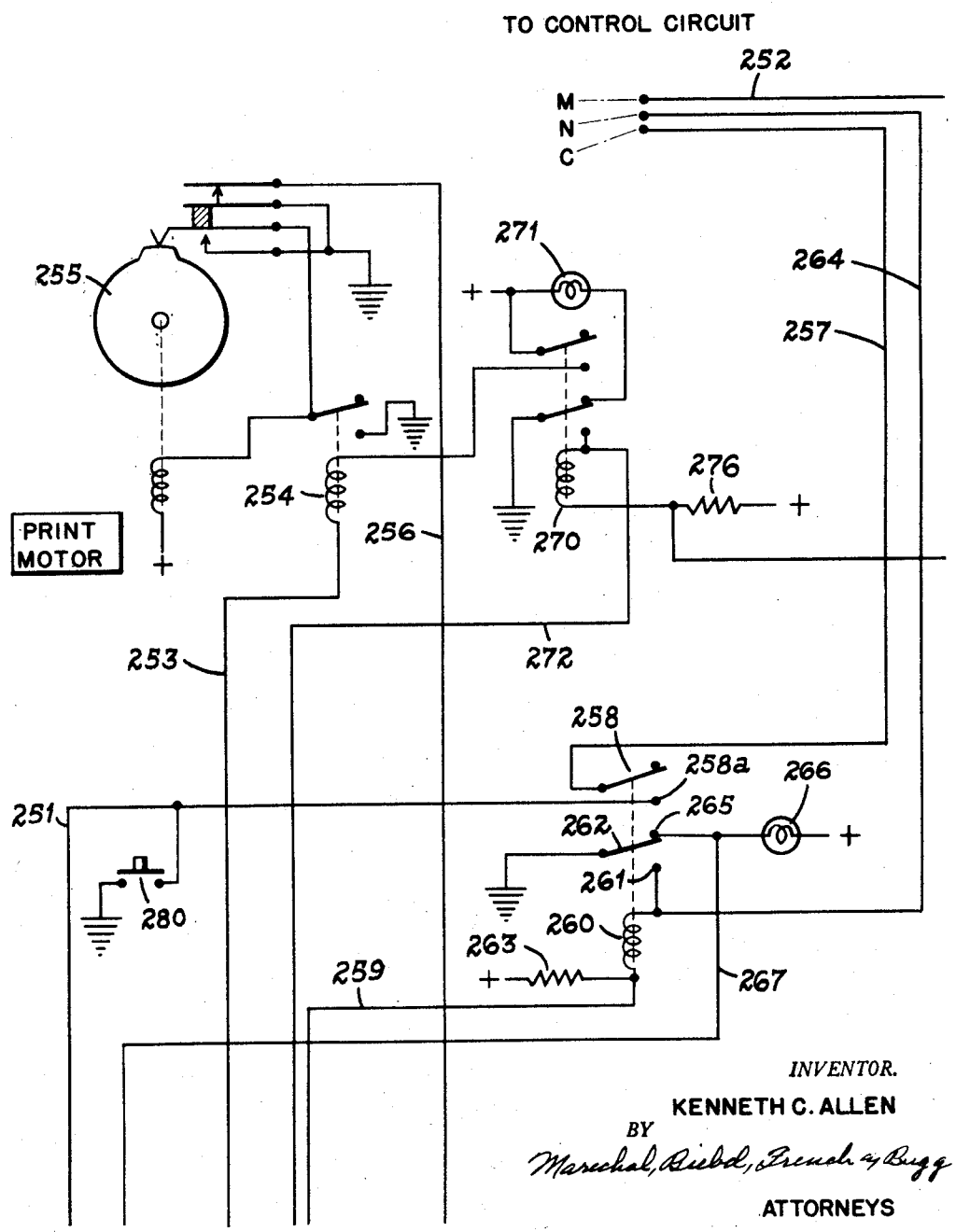
Figure 22:
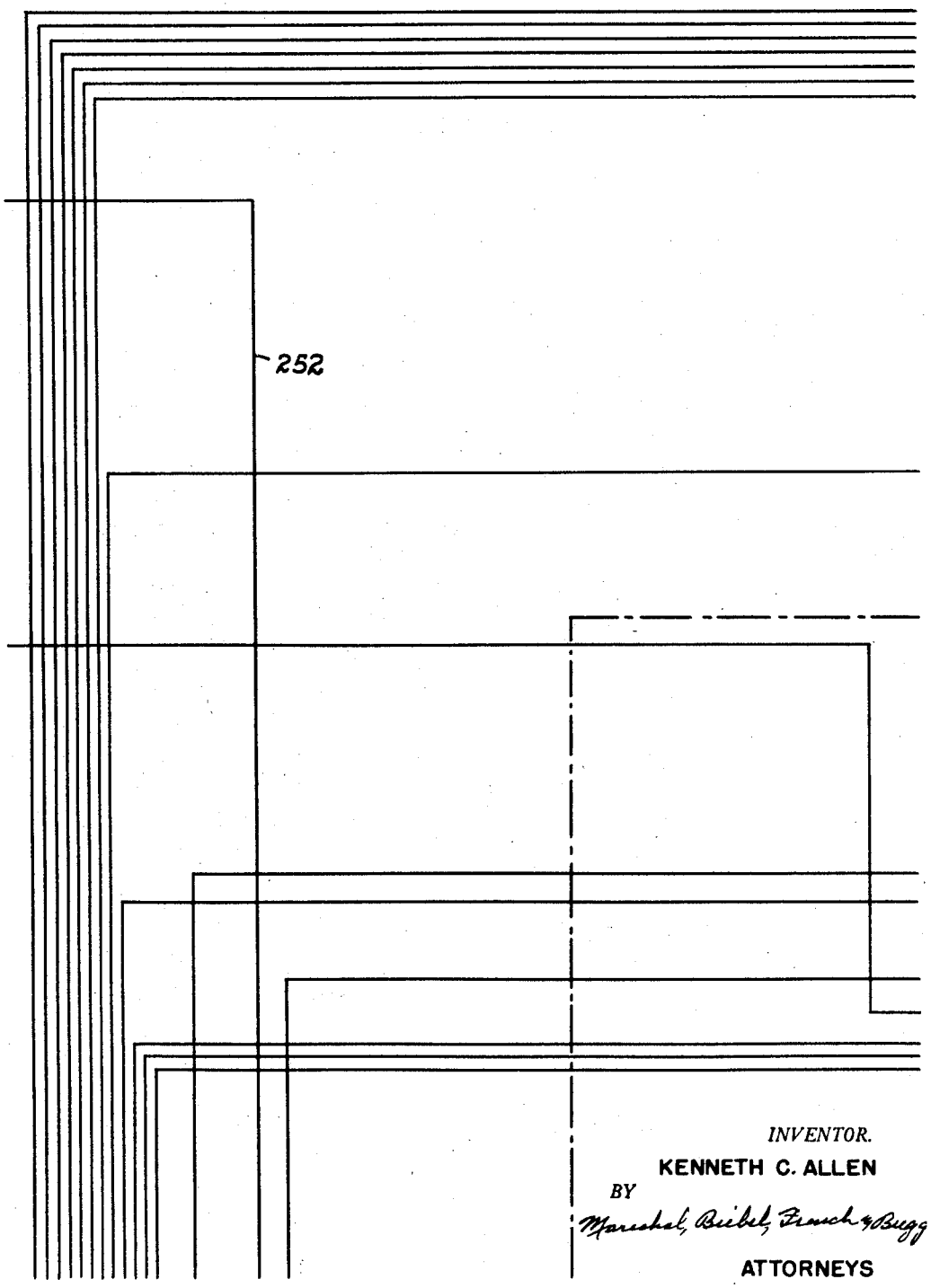
Figure 23:
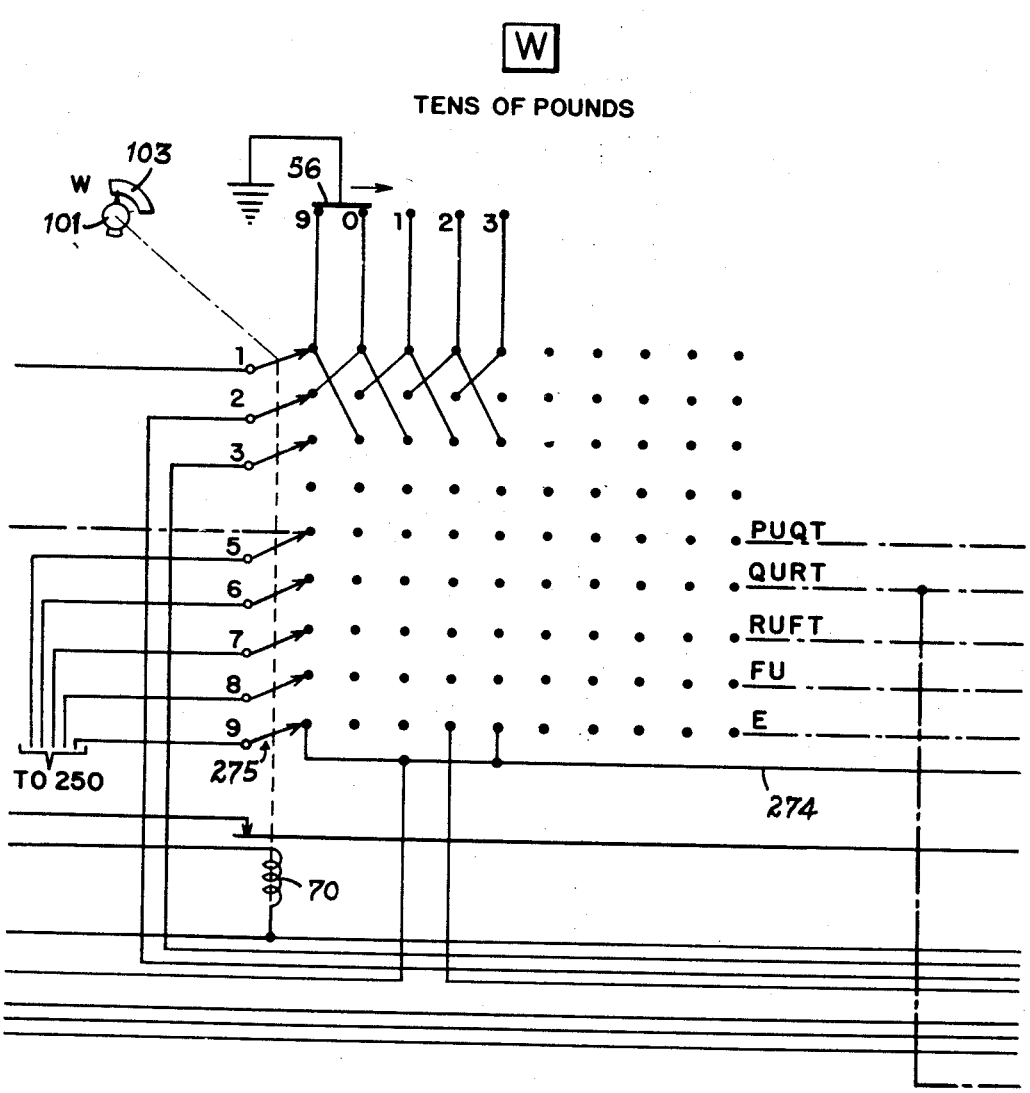
Figure 24:
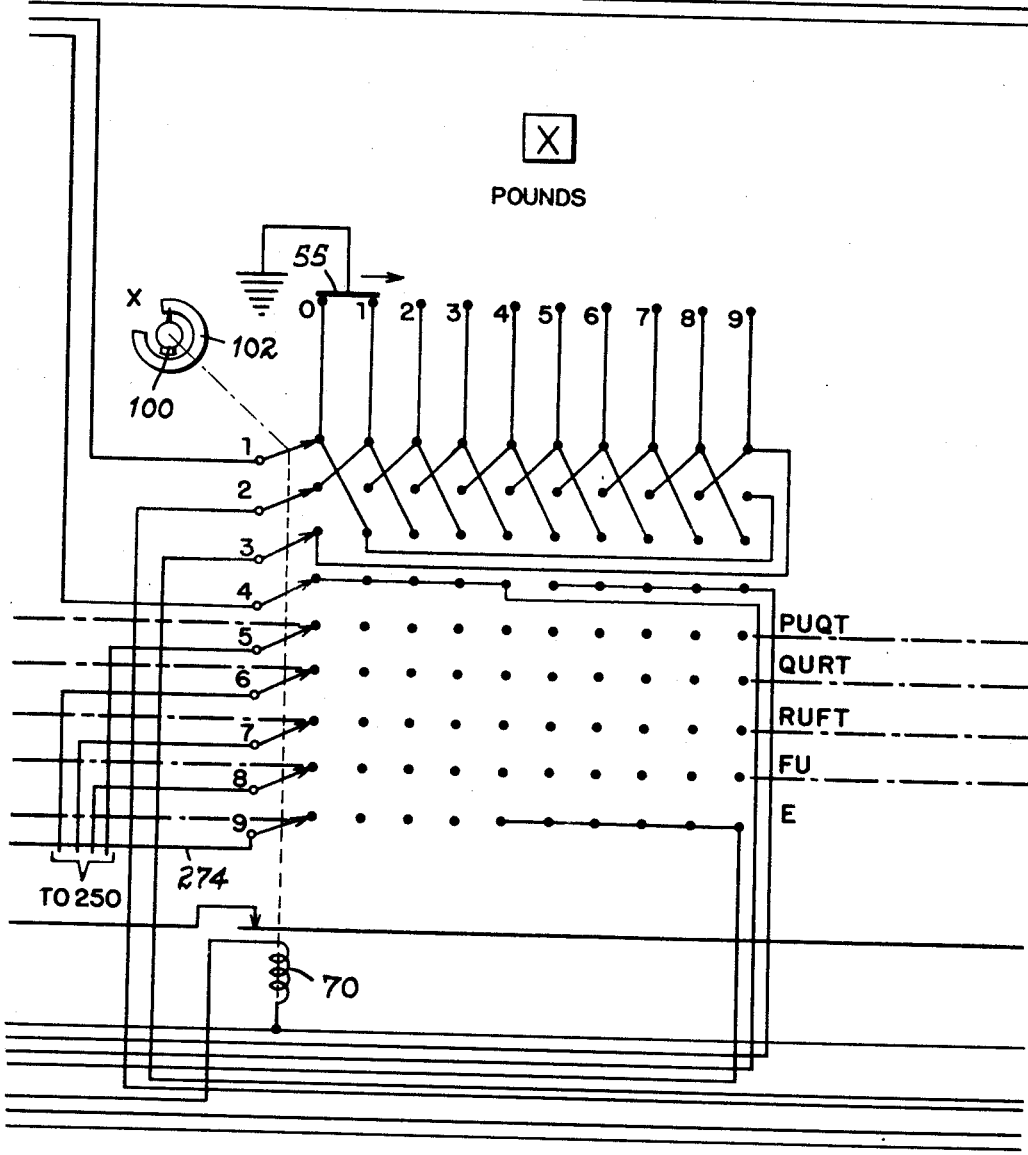
Figure 25:
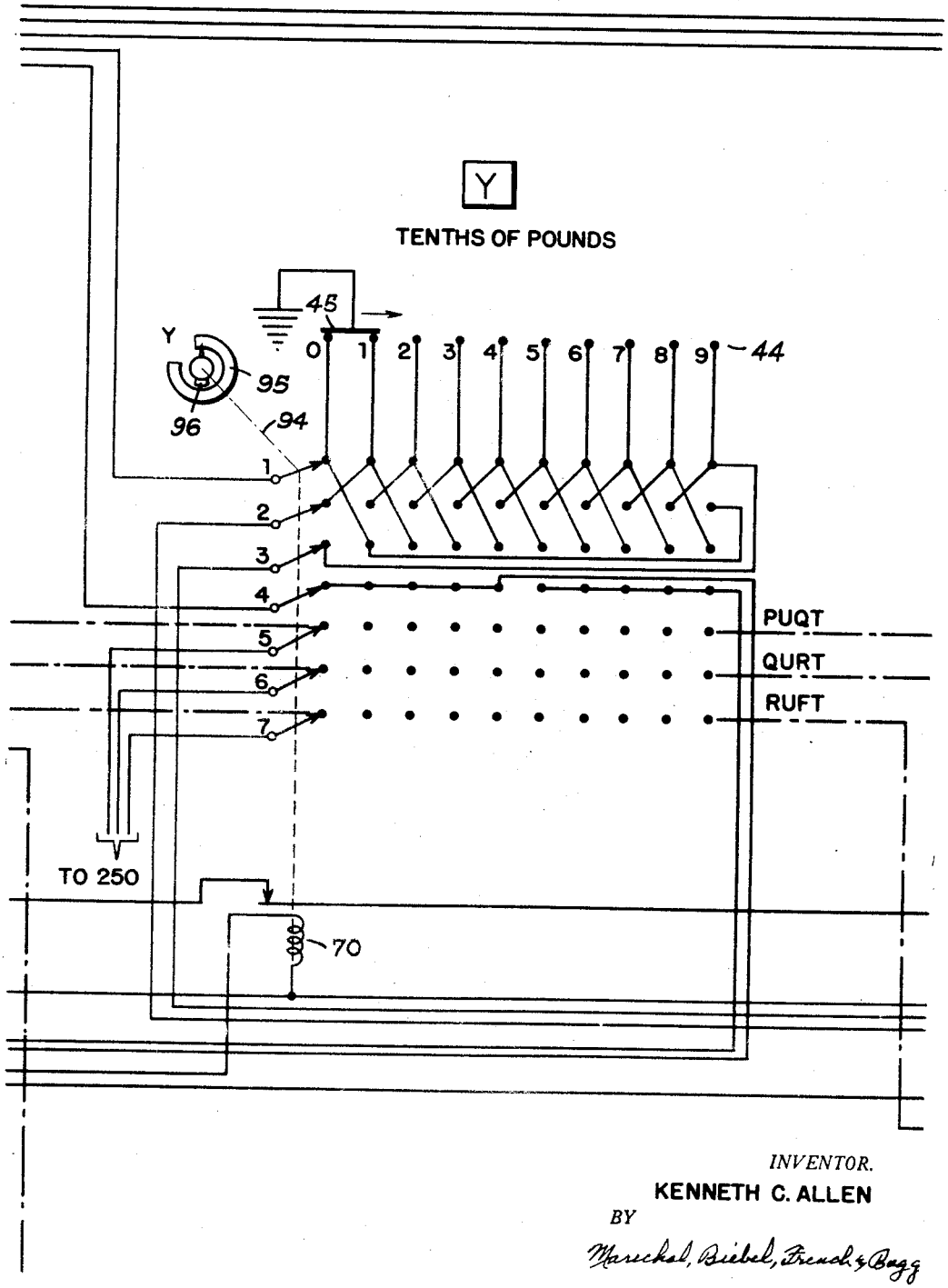
Figure 26:
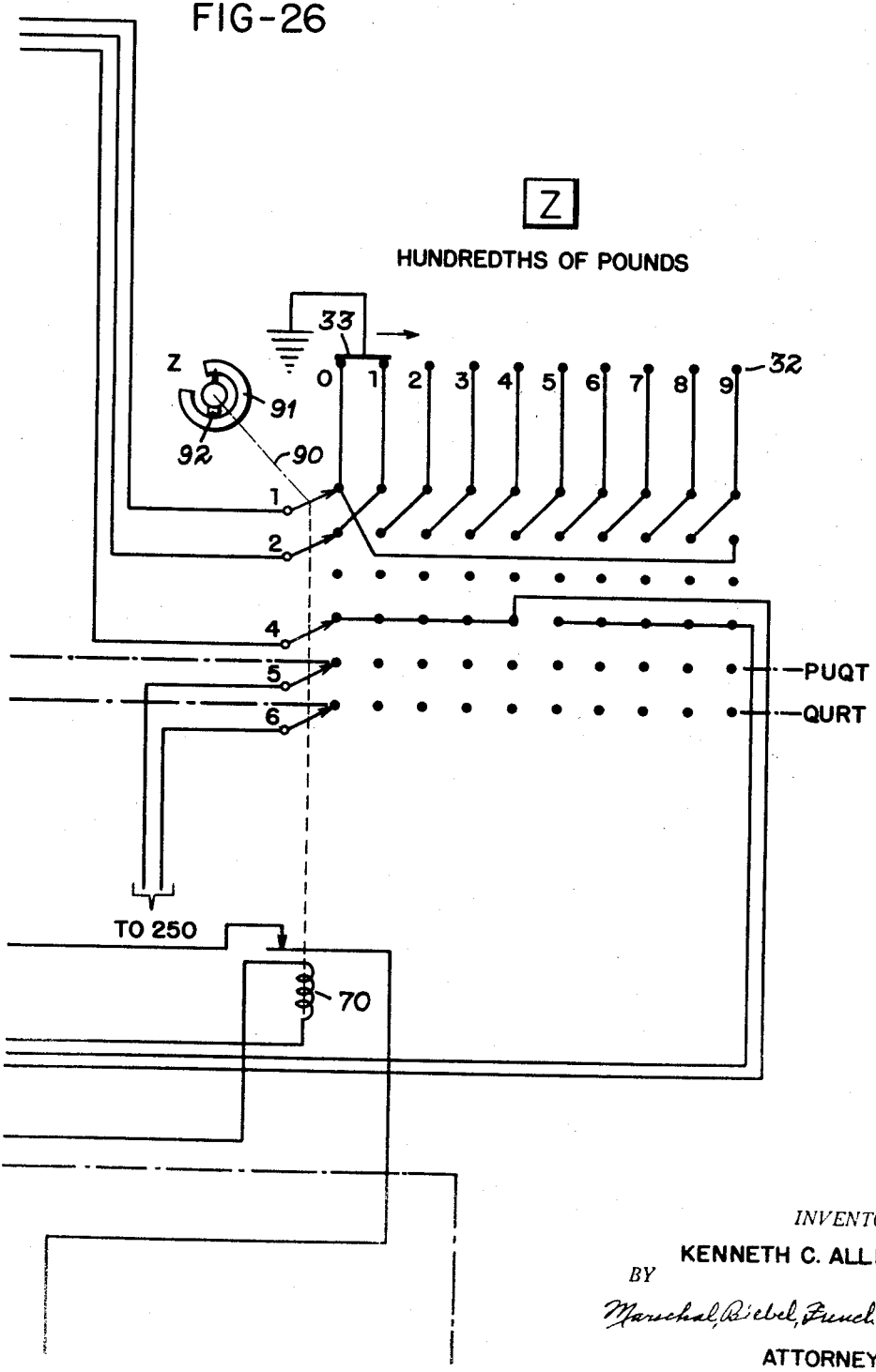
Figure 27:
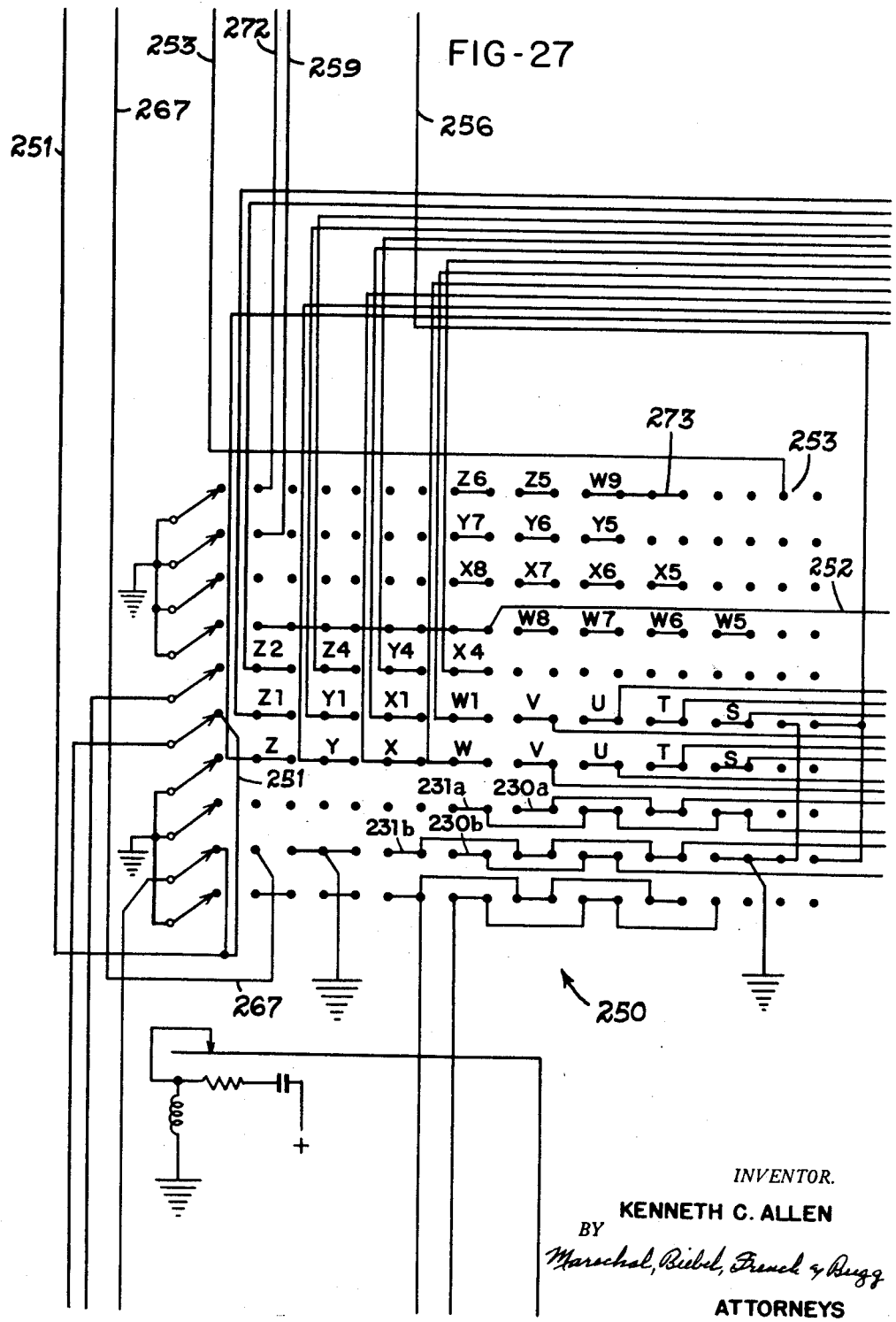
Figure 28:
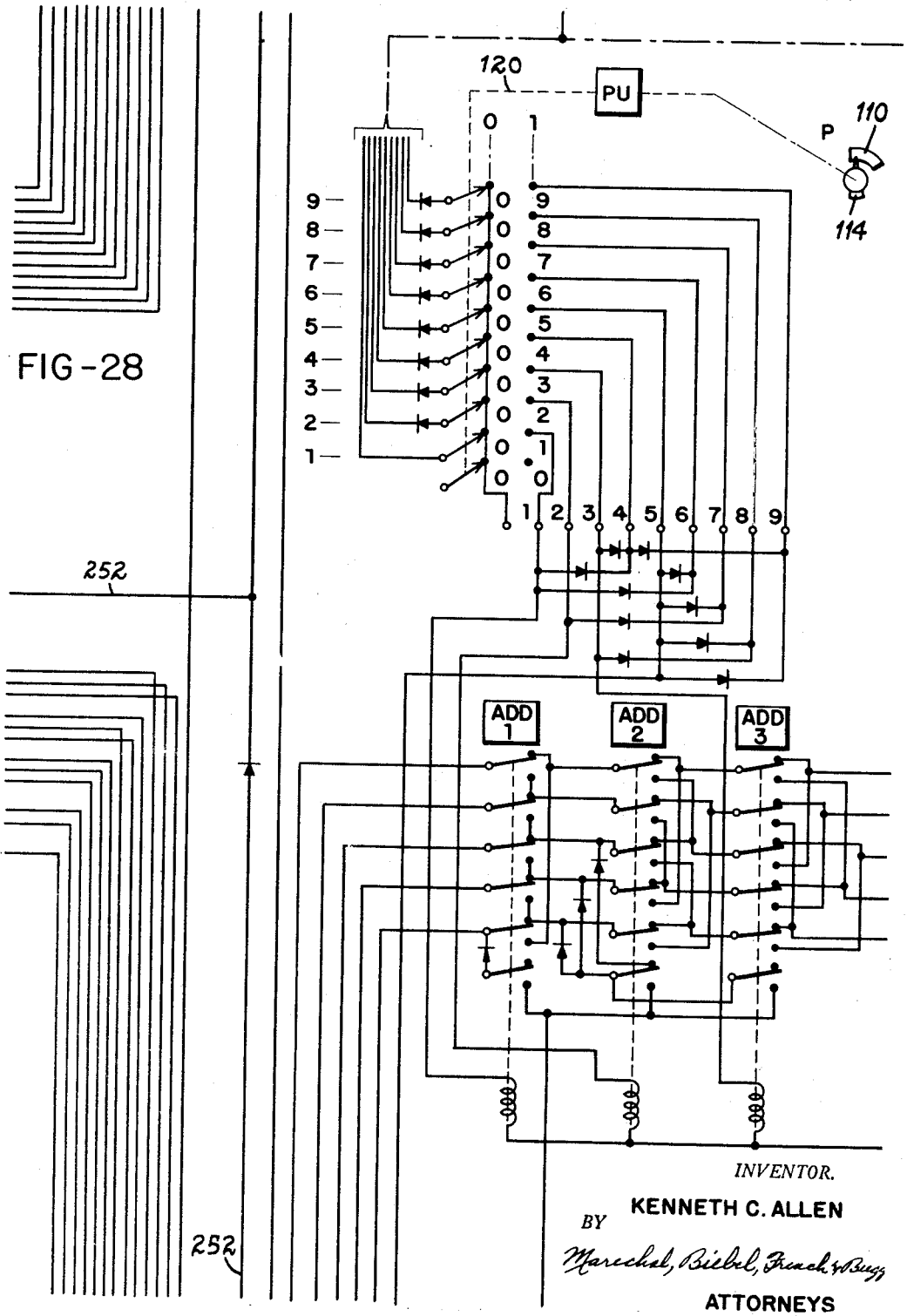
Figure 29:
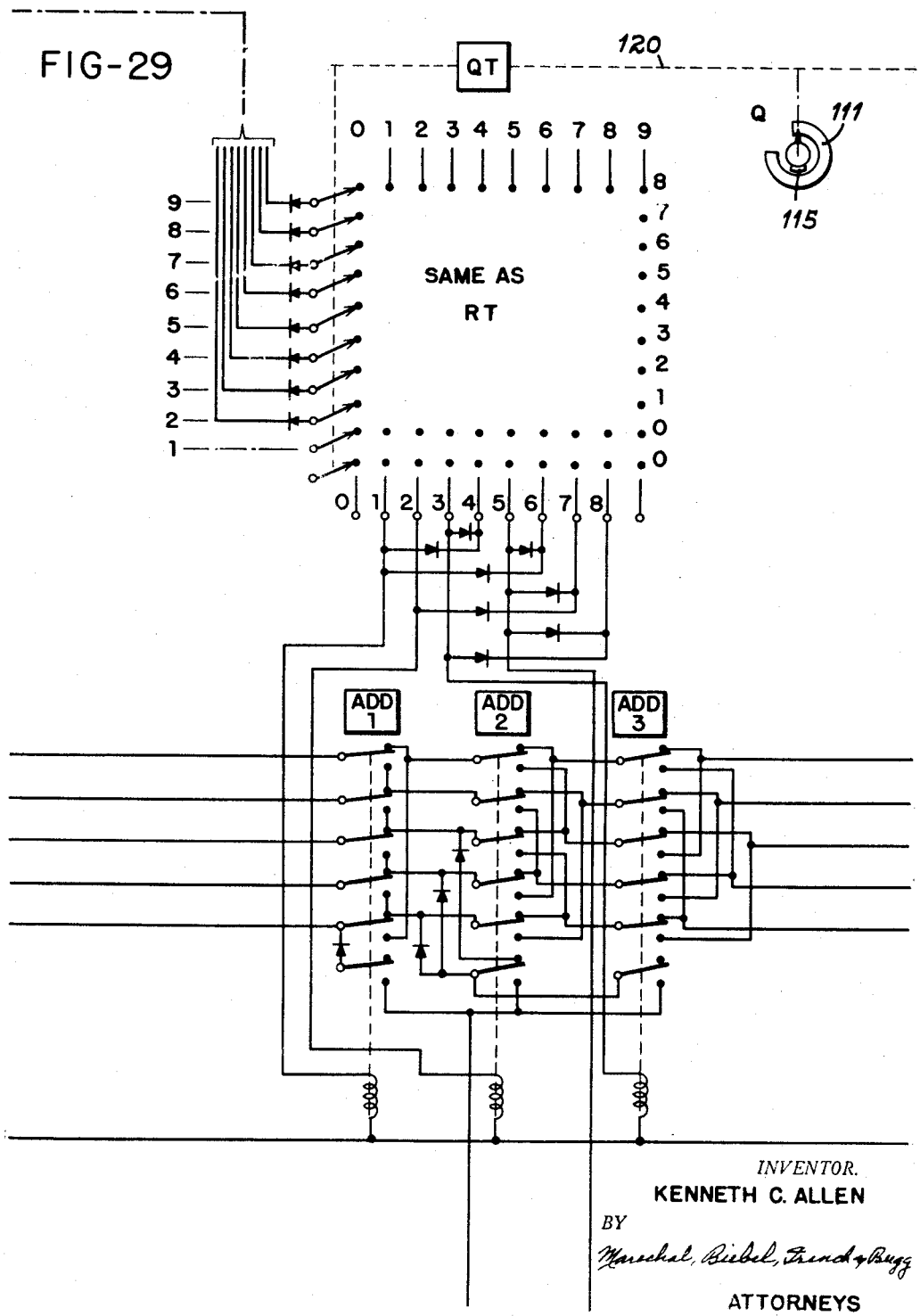
Figure 30:
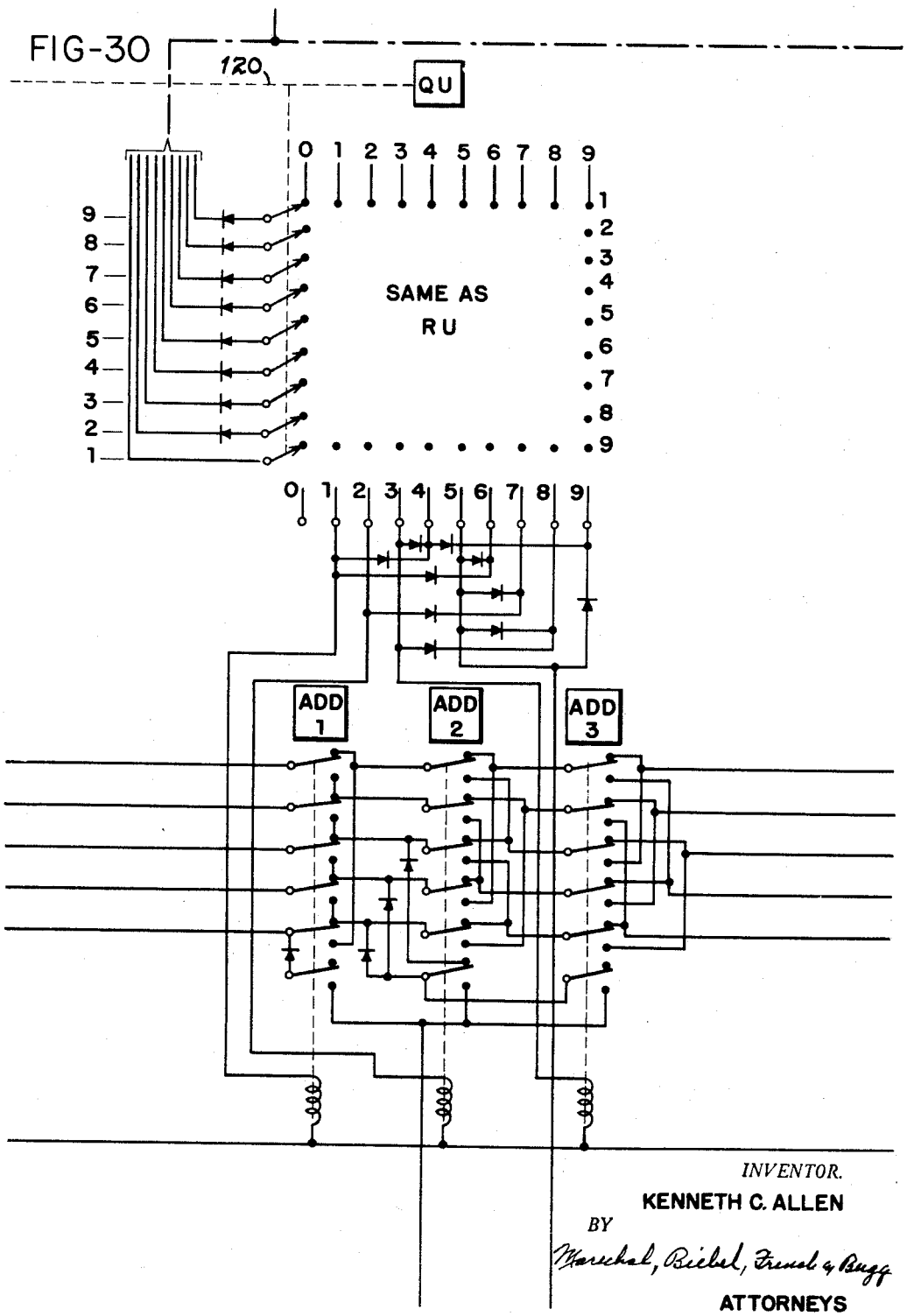
Figure 31:
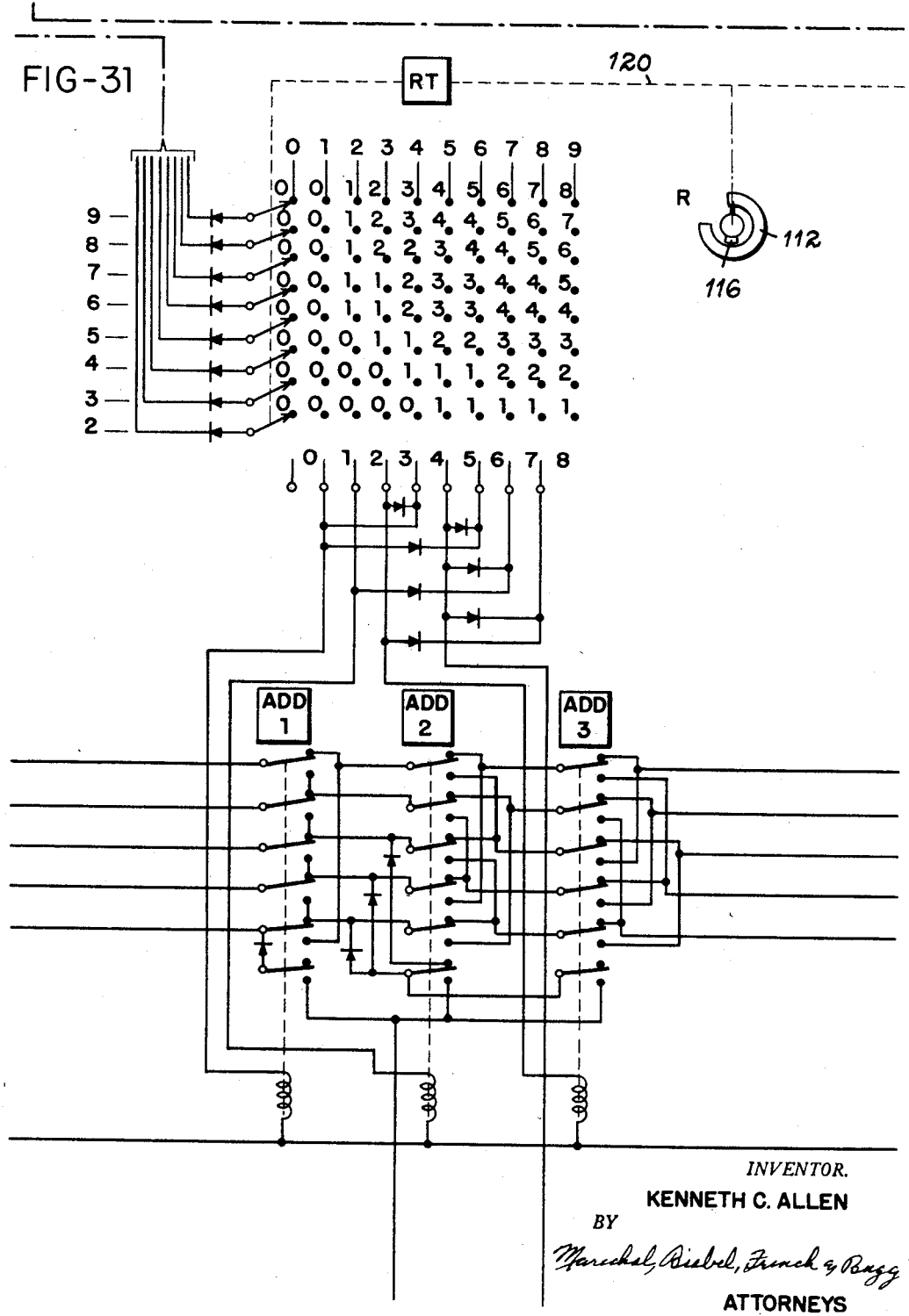
Figure 32:
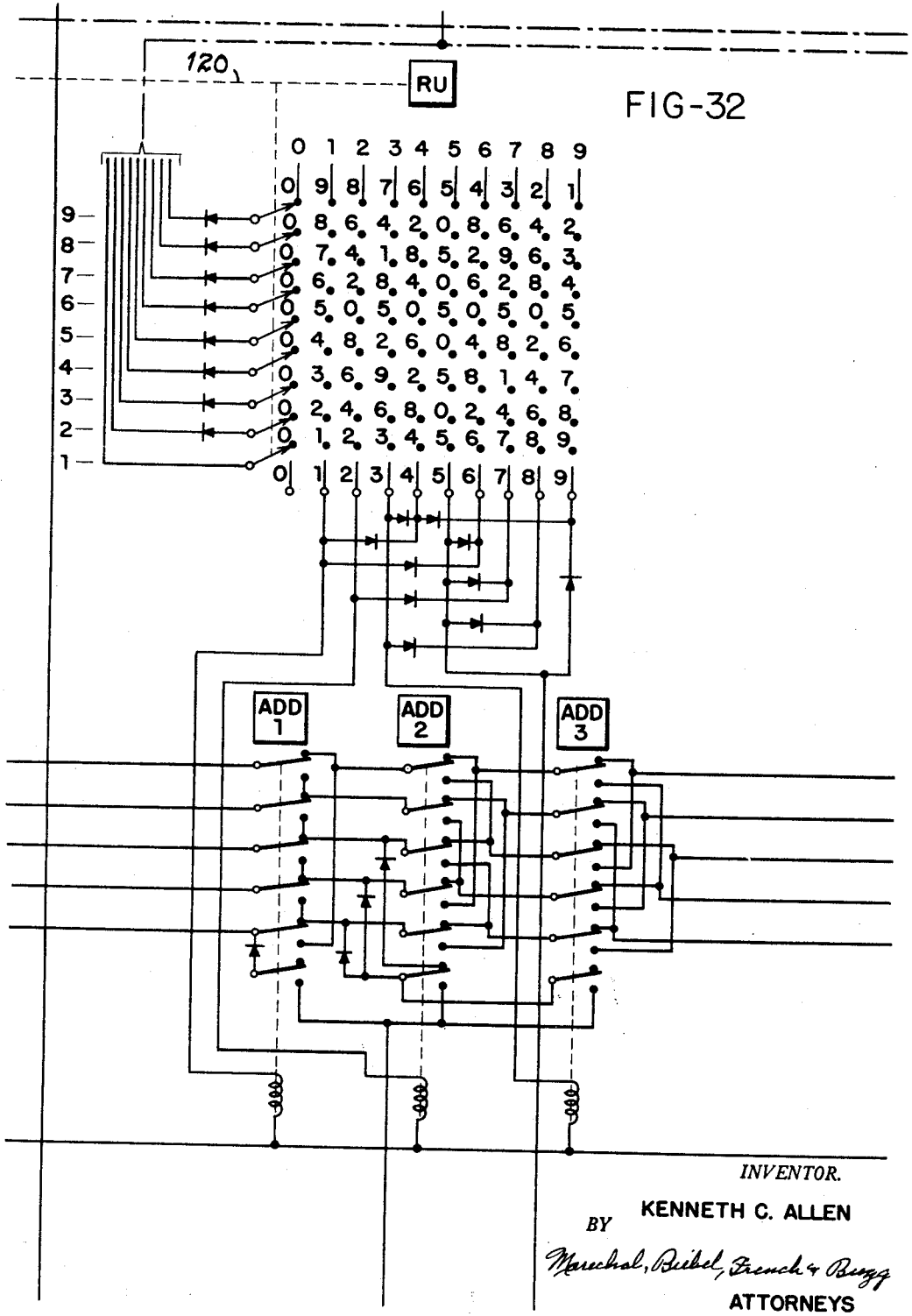
Figure 33:
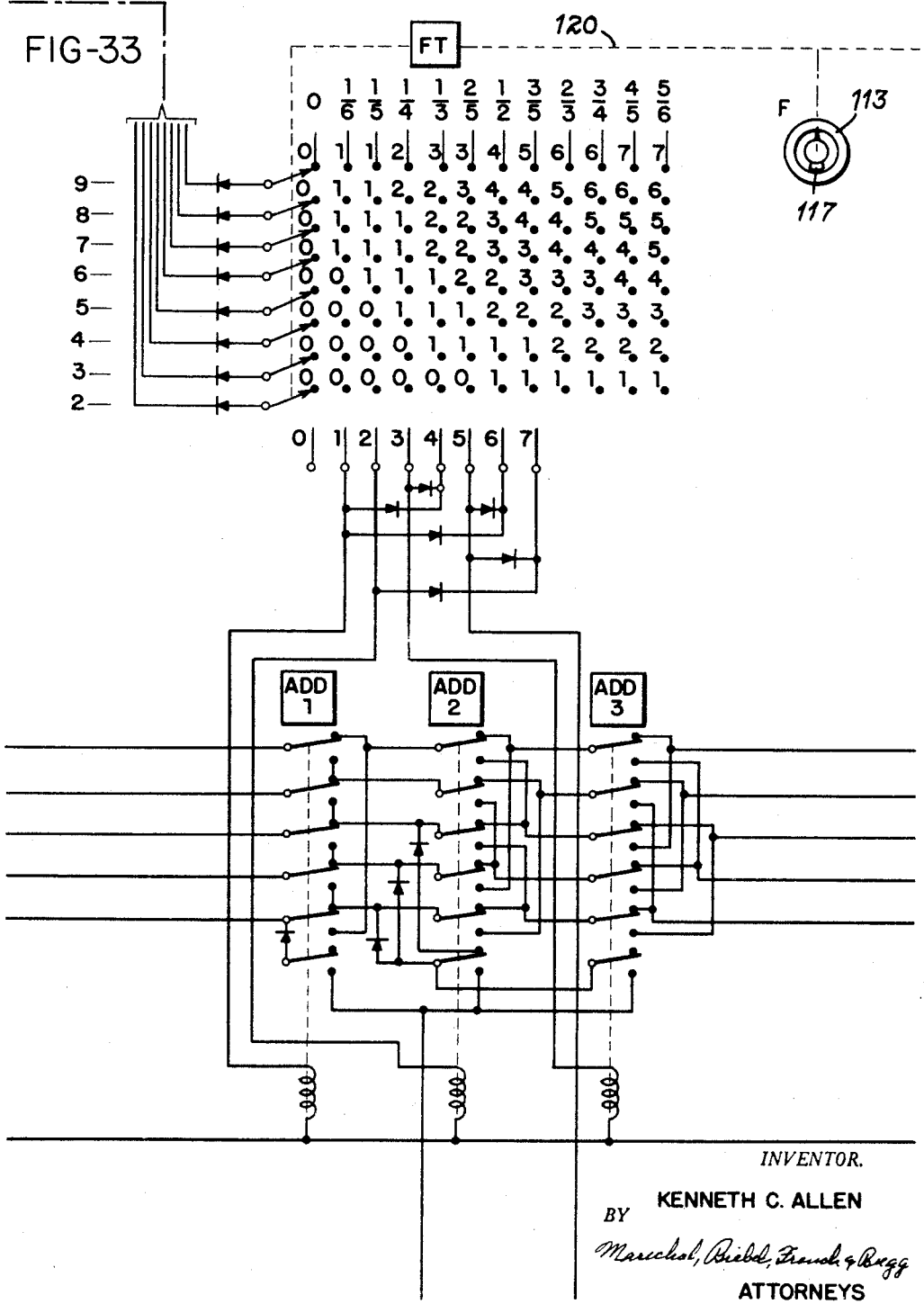
Figure 34:
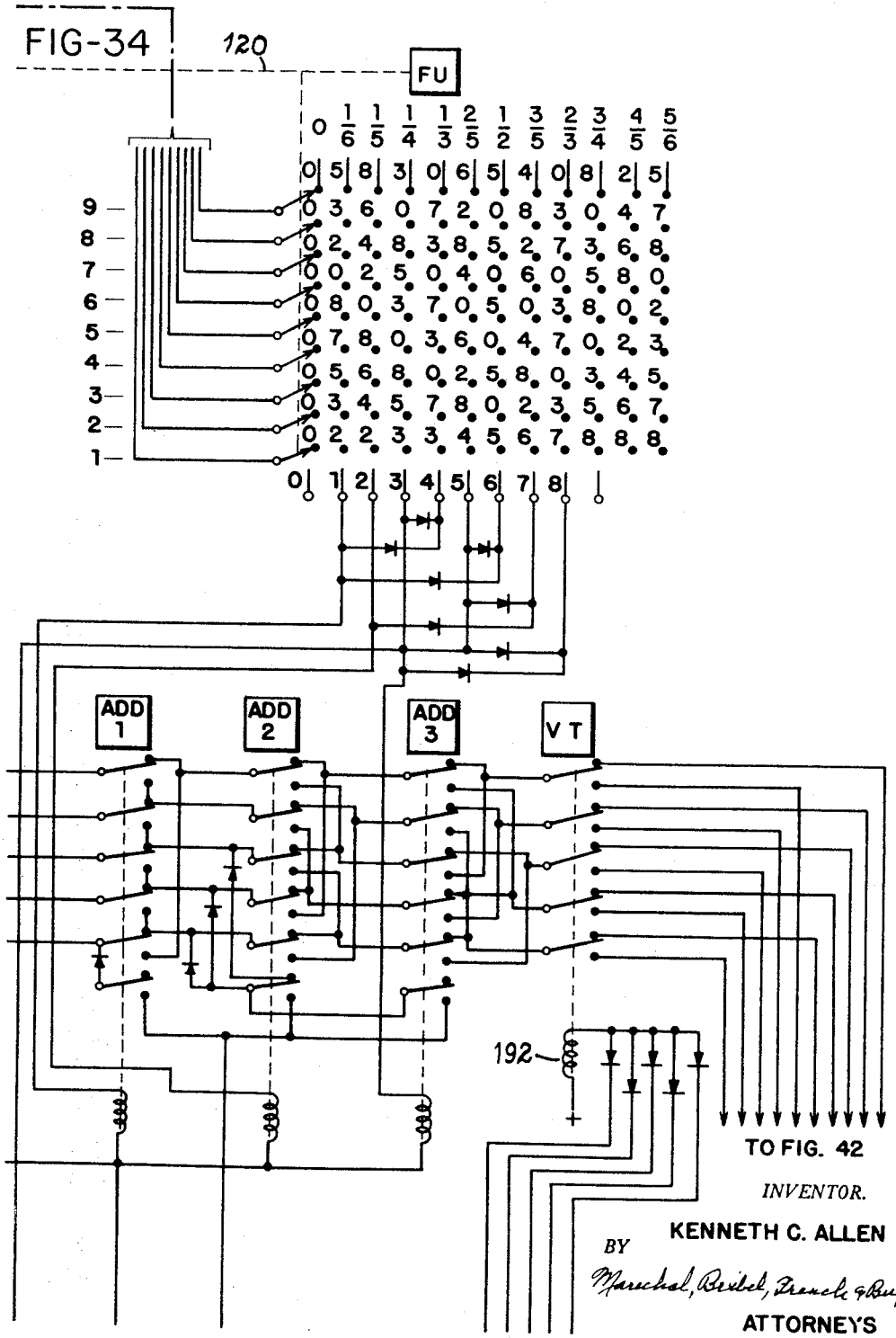
Figure 35:
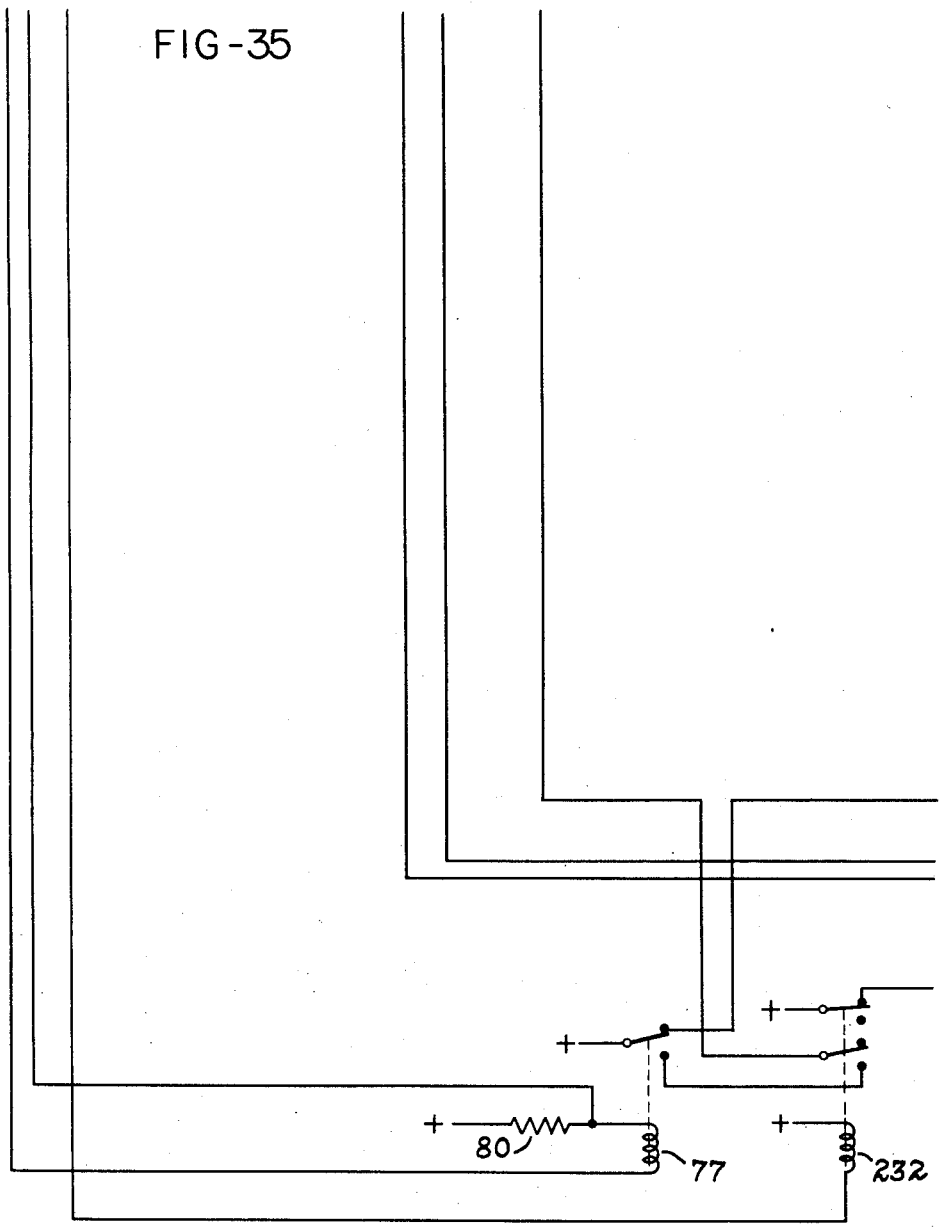
Figure 36:
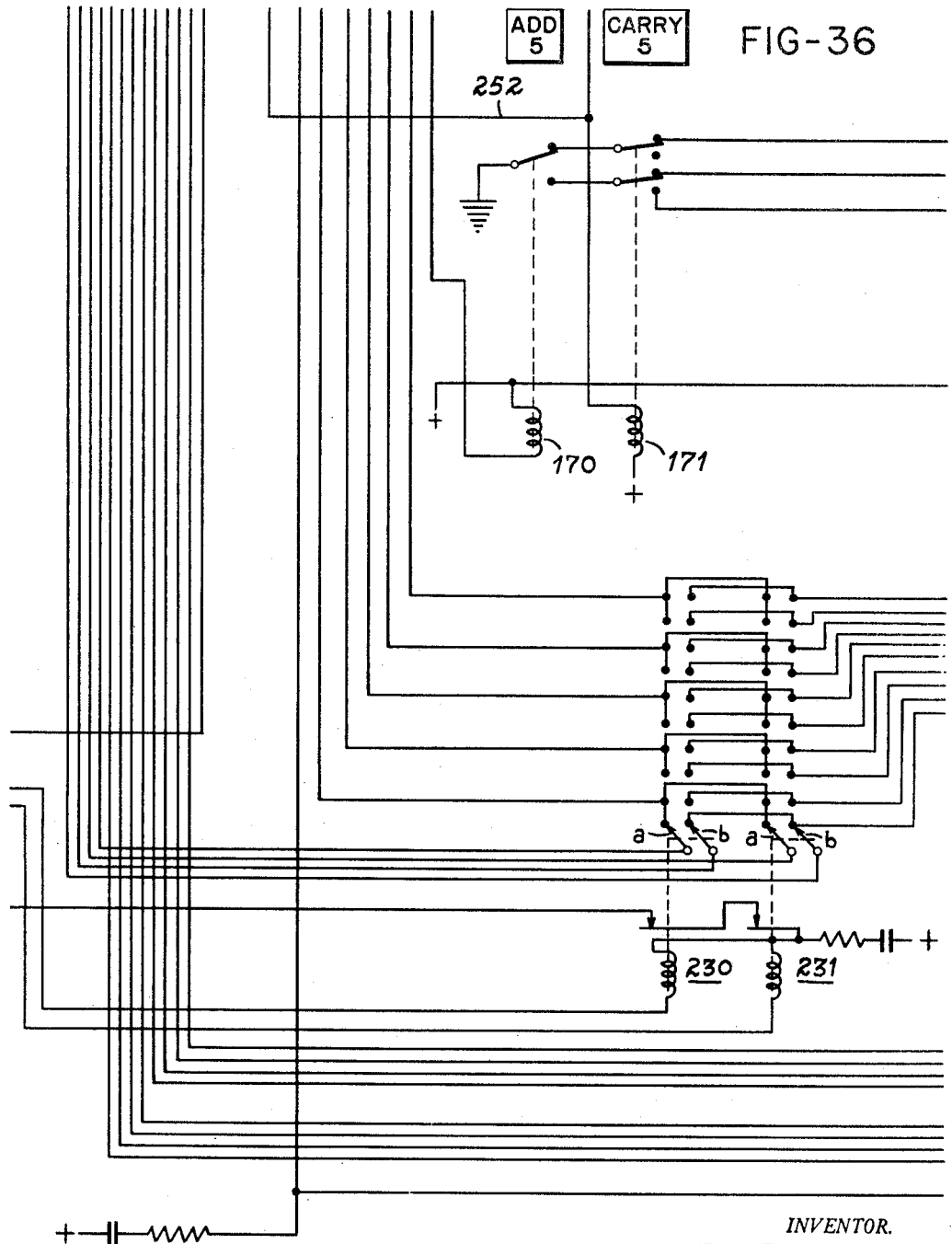
Figure 37:
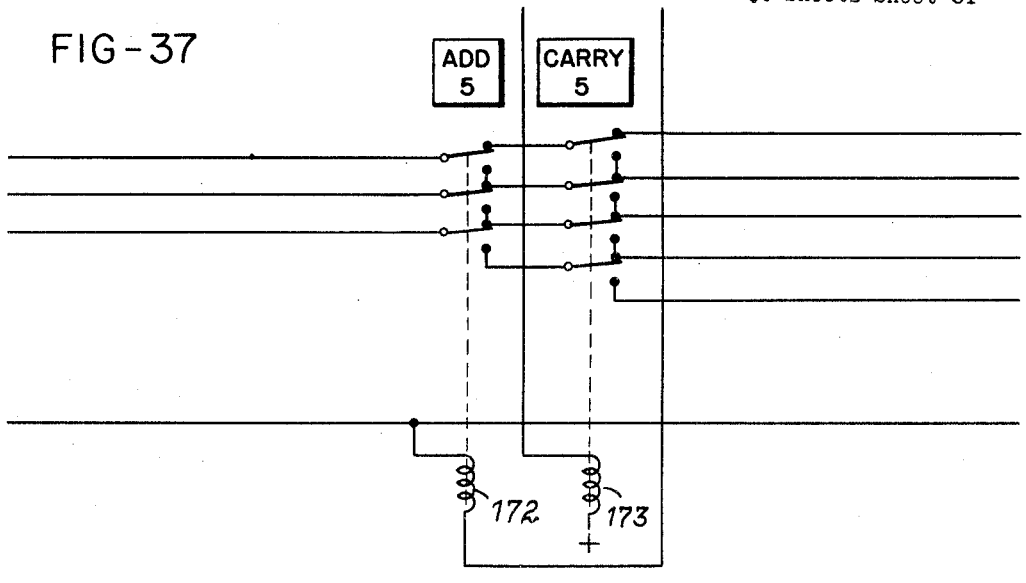
Figure 38:
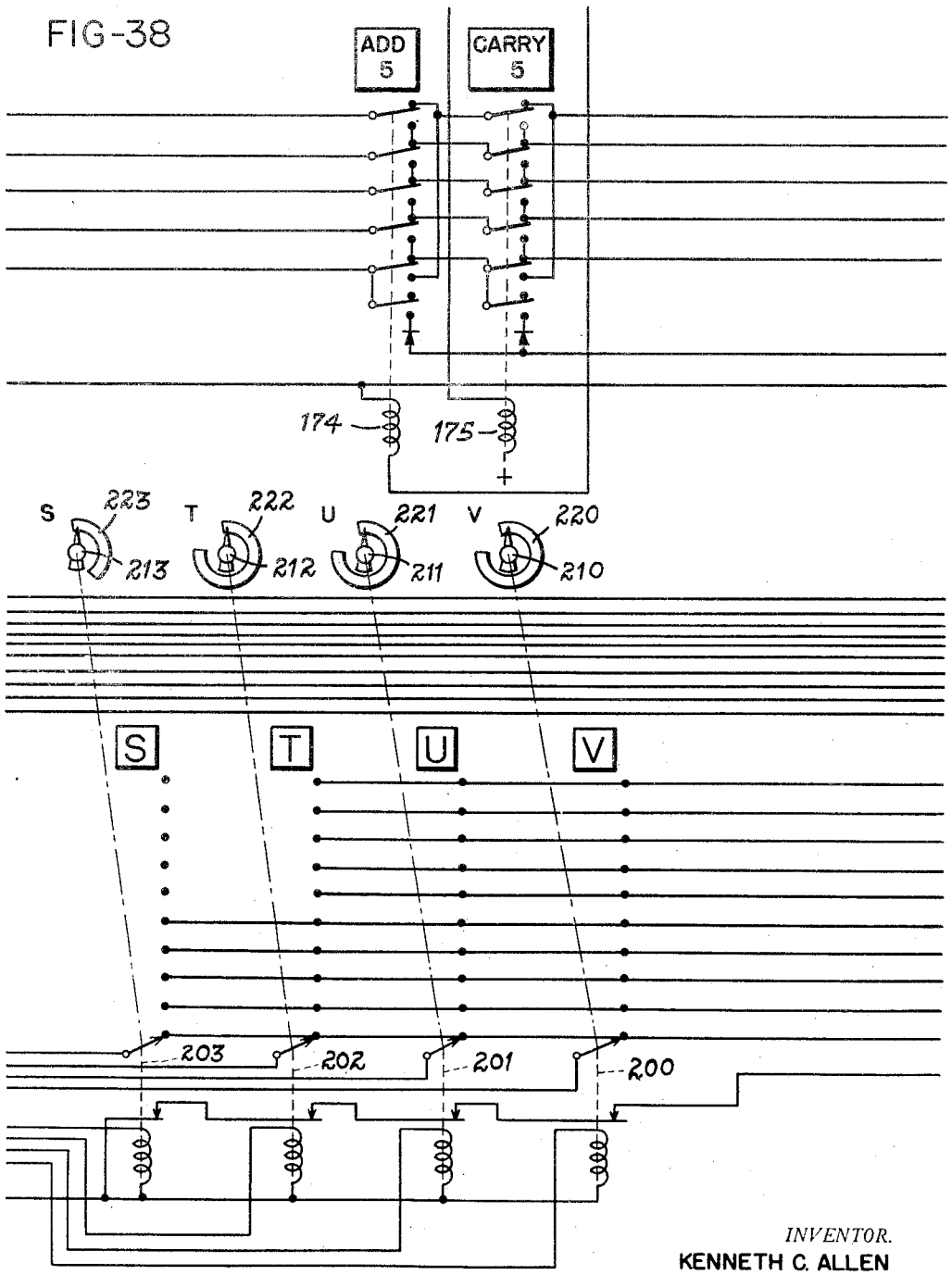
Figure 39:
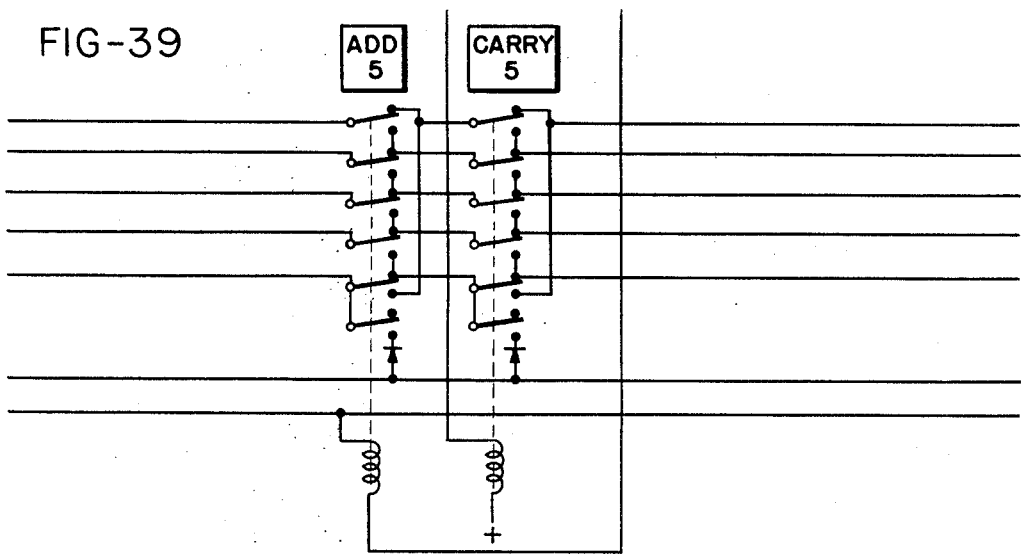
Figure 41:
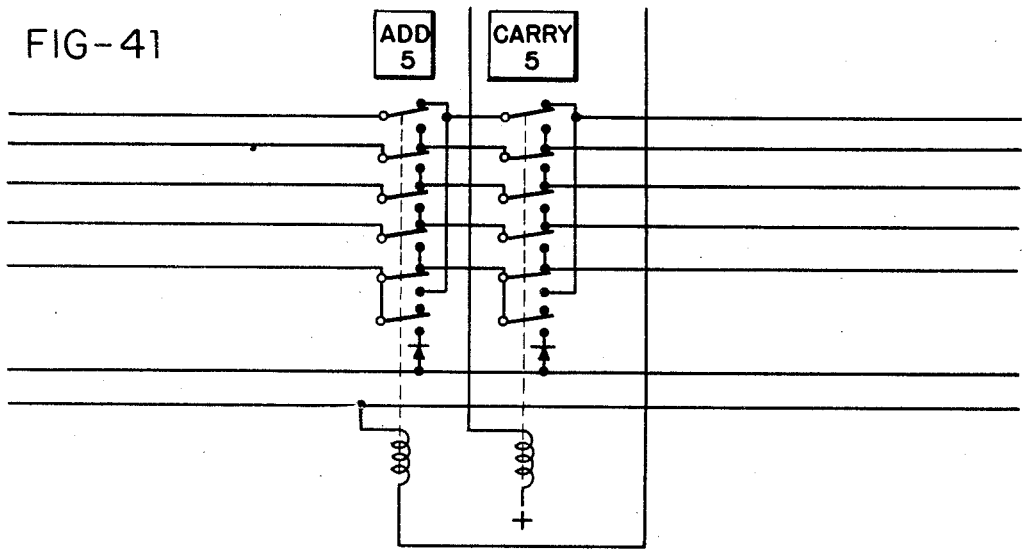

When selector 250 has reached its 12 position the read-out of the weight digits will have been completed. Throughout the 12, 13, 14 and 15 positions, wiper 1 will be grounding wire 273 which is connected to the wiper of the E deck of the W stepping switch as shown in Fig. 19. This E or 9th deck is another deck similar to those already described and is represented diagrammatically as appearing on both the W and X switches in Fig. 9. It will be understood that the wipers of these switches advance over the successive contact points in the same manner and as a part of the mechanism already described for the operation of the remaining decks of these switches.

Fig. 19 represents by way of example the connections within the E decks of switches W and X in order to provide for disabling the printing circuit and preventing the printing of a ticket when either the scale is at a position below its normal 0 weight position, or when it has traveled to a position above its normal maximum range, in this case assumed to be a 23.99 pound actual limit or a 24 pound nominal limit. Obviously a scale of this capacity could never give an indication of 90 pounds so that the only time when the W switch would stop in the 9 position would be in the case of a negative reading. This is so because the digitalizing functions previously described operate in a manner equivalent to the commonly known Geneva type counter wherein the setting of the counter in a position one unit below 0 causes the displaying of a series of nines.

If because of improper adjustment of the scale this condition exists and an attempt is made to compute and print a ticket, switch W (Fig. 19) will have stopped on 9 and when selector 250 is in its 12th through its 15th positions wire 274 will be grounded through wiper 275 of the E deck of switch W and wire 273. The grounding of wire 274 cuts off the power to relay 270 by grounding its positive end and dissipating the voltage through resistor 276. The relay 270 thus opens, displays an error signal and prevents an operation of the printer in the same manner as has just been described for the operation of this relay in case of a power failure. Inspection of Fig. 19 will show that if switch W has stopped in position 2 and switch X is stopped in any position above the 3 position, wire 274 will again be grounded and relay 270 will be similarly opened.

Figure 18:
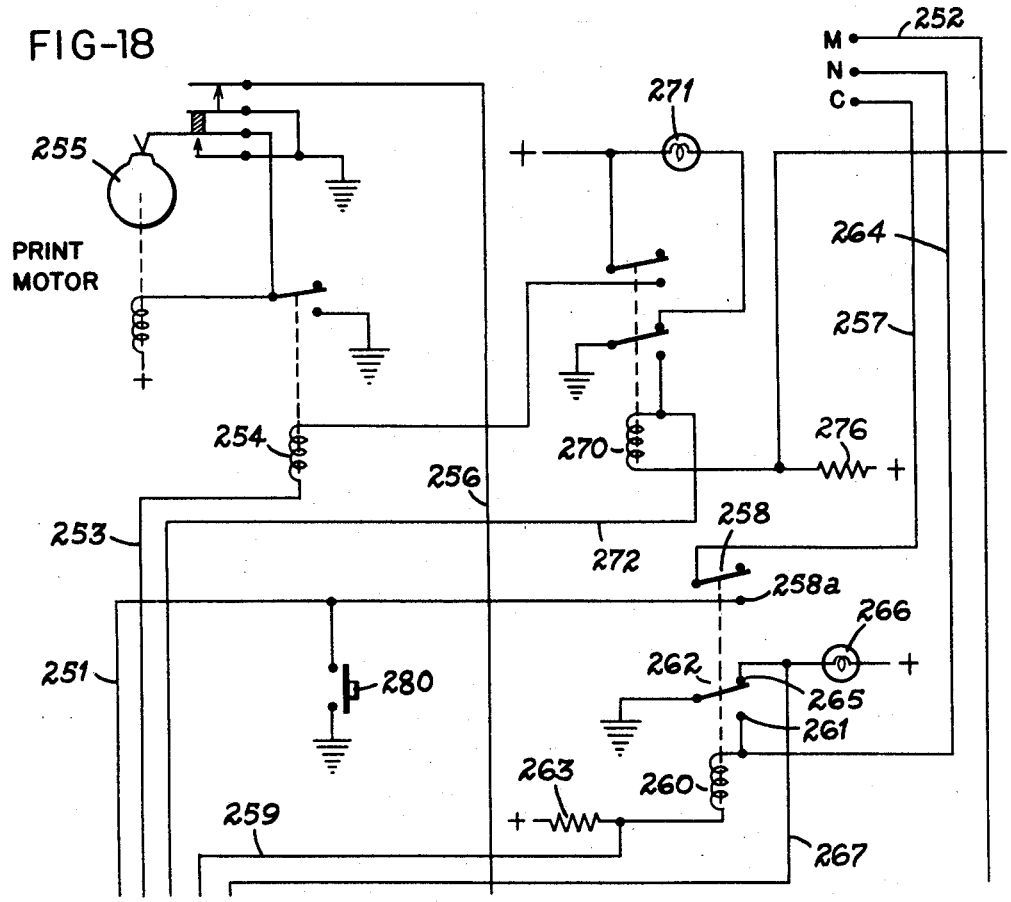
Fig. 18 is a schematic circuit showing the controls which prevent operation of the system except when it is in proper condition.

Push button 280 on Fig. 18 provides for manual operation of the complete read-out computing and printing cycle which might be used for test purposes or the repeated printing of several duplicate tickets.

Indication of results

The final results of the entire weighing and computing operations are indicated as being displayed visually on the front of the panel shown in Fig. 1 by the several pointers in cooperation with the marked indicator dials. In addition the mechanism is shown as producing a printed ticket on which the three factors are displayed, that is, the weight, the unit price, and the value. It will likewise be understood that if desired this ticket may also include a serial number. Further, as indicated in Fig. 1, the mechanism may be coupled with a typical register indicated at 300, by either coupling the several shafts of the pointers into the register, or by electrical connections and appropriate mechanism similar to that already described which will set the same factors into the register. A series of department keys 301 are likewise shown which may be actuated for indicating the type of merchandise, the clerk involved, or the like, in accordance with usual practice. Such a register has the usual printer assembly 302 in which there is a continuous tape 303 providing a continuous record of the series of transactions, which may likewise be identified with serial numbers corresponding to those on the ticket. In addition, the register provides for obtaining totals and sub-totals in accordance with the actuation of the individual departrment keys. In this way transactions over a period can be totalled and a complete record thereof provided.

The composite circuit diagram is shown fully in Figs. 20 through 42 inclusive, showing the full series of circuits employed in a computing scale for weighing up to twenty-four pounds in weight and having manually presettable prices ranging up to two dollars a pound, including every penny and a full range of fractions of pennies so that any desired unit price within the range may be selected. In all cases the final product is produced to the nearest cent, thereby providing for indicating and registering the transactions so involved. The system produces a printed ticket for each transaction showing the weight, unit price and value, and a register may be likewise actuated concurrently for producing totals and sub-totals by departments in accordance with known procedure in this respect. It will be understood that the range of operation of the composite system so shown is adequate to achieve these results, and that it may be expanded or curtailed as desired to satisfy the particular circumstances involved by addition or deletion of similar components in the system.

The invention thus provides a weighing and pricing system which is rapid and accurate, which fully complies with all present weights and measures standards, and is economically constructed of parts which have long life and relative freedom from maintenance problems. Where necessary, maintenance can be performed readily and thus the scale economically maintained in operation in continuous weighing operations such as those encountered in prepackaging of commodities for chain store grocery operations and the like.

Reference to a wire, contact, circuit or the like being grounded or energized is intended to include both conditions, as well as both polarities, since it is the means by which a particular wire is selected or conditioned so that it will be found by the selector or stepping switch, the particular connection employed being determined in relation to the circuit conditions desired.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a system for weighing, computing and printing a record of the weight and value of each of a plurality of successively weighed loads, the combination of a scale including a weighing mechanism adapted to be deflected away from a zero reference position in proportion to the weight of a load applied to the scale to a balance position corresponding to said load, a computer for computing the value of each weighed load, means for reading out data corresponding to said balance position of said weighing mechanism and transmitting said data to said computer, control means responsive to establishment of said balance position of said weighing mechanism for initiating the operation of said readout means, means establishing a range of weight for said system having maximum and minimum limits, means for sensing a balance position of said weighing mechanism outside of said range, means responsive to completion of the computing operation of said computer for printing a record of the weight and value of said load, and means controlled by said sensing means for preventing the printing of said record by said printing means whenever said balance position of said weighing mechanism is outside of said range.

2. In a system for weighing, computing and printing a record of the weight and value of each of a plurality of successively weighed loads, the combination of a scale including a lever adapted to be deflected away from a zero reference position in proportion to the weight of a load applied to the scale, a shaft adapted to be displaced from a zero reference position to a position corresponding to said load, a reversible drive motor for driving said shaft, means actuated in response to deflection of said lever for energizing said motor to drive said shaft toward said corresponding position, a computer for computing the value of each weighed load, means for reading out data corresponding to said balance position of said lever and transmitting said data to said computer, control means responsive to establishment of said corresponding position of said shaft for initiating the operation of said read-out means, means establishing a range of weight for said system having maximum and minimum limits, means for sensing a balance position of said lever outside of said range, means responsive to completion of the computing operation of said computer for printing a record of the weight and value of said specific load, and means controlled by said sensing means for preventing the printing of said record by said printing means whenever said balance position of said lever is outside of said range.

3. In a system for weighing, computing and printing a record of the weight and value of each of a plurality of successively weighed loads, the combination of a scale including a lever adapted to be deflected away from a zero reference position in proportion to the weight of a load applied to the scale to a balance position corresponding to said load, a computer for computing the value of each weighed load, means for reading out data corresponding to said balance position of said lever and transmitting said data to said computer, control means responsive to establishment of said balance position of said lever for initiating the operation of said read-out means, means establishing a range of weight for said system having maximum and minimum limits, means responsive to completion of the computing operation of said computing means for printing a record of the weight and value of said specific load, and means cooperating with said read-out means in response to establishment of a balance position of said lever outside of said range to produce a signal of said out-of-range balance position and to prevent the printing of said record by said printing means.

4. In a system for weighing, computing and printing a record of the weight and value of each of a plurality of successively weighed loads, the combination of a scale including a lever adapted to be deflected away from a zero reference position in proportion to the weight of a first load applied to the scale to a first balance position corresponding to said first load, follow-up means actuated by deflection of said lever to a first position corresponding to said first balance position of said lever, a computer for computing the value of each weighed load, means for reading out data corresponding to said first position of said follow-up means and transmitting said data to said computer, control means responsive to establishment of said first position of said follow-up means for blocking further movement thereof while leaving said lever free for further deflection upon replacement of said first load by a second load and for simultaneously initiating the operation of said read-out means for said first load, means establishing a range of weight for said system having maximum and minimum limits, means for sensing a balance position of said lever outside of said range, means responsive to completion of the operation of said read-out means for said first load for terminating said blocking action of said control means to provide for reactuation of said follow-up means upon further deflection of said lever during completion of the operation of said computer for said first load, means responsive to completion of the computing operation of said computing means for printing a record of the weight and value of said first load, and means controlled by said sensing means for preventing the printing of said record by said printing means whenever said balance position of said lever is outside of said range.

5. In a system for weighing, computing and printing a record of the weight and value of each of a plurality of successively weighed loads, the combination of a scale including a lever adapted to be deflected away from a zero reference position in proportion to the weight of a first load applied to the scale to a first balance position, a shaft adapted to be displaced from a zero reference position to a first position corresponding to said first balance position of said lever, a reversible drive motor for driving said shaft, means actuated in response to deflection of said lever for energizing said motor to drive said shaft toward said first position thereof, a computer for computing the value of each weighed load, means for reading out data corresponding to said first balance position of said lever and transmitting said data to said computer, control means responsive to establishment of said first position of said shaft for deenergizing said motor to hold said shaft in said first position thereof while leaving said lever free for further deflection upon replacement of said first load by a new load and for simultaneously initiating the operation of said read-out means for said first load, means establishing a range of weight for said system having maximum and minimum limits, means for sensing a balance position of said lever outside of said range, means responsive to completion of the operation of said read-out means for said first load for terminating said deenergizing action of said control means to provide for reenergizing of said motor in response to deflection of said lever by said second load during completion of the operation of said computer for said first load, means responsive to completion of the computing operation of said computing means for printing a record of the weight and value of said first load, and means controlled by said sensing means for preventing the printing of said record by said printing means whenever said balance position of said lever is outside of said range.

6. In a system for weighing, computing and printing a record of the weight and value of each of a plurality of successively weighed loads, the combination of a scale including a lever adapted to be deflected away from a zero reference position in proportion to the weight of a first load applied to the scale to a first balance position corresponding to said first load, follow-up means actuated by deflection of said lever to a first position corresponding to said first balance position of said lever, a computer for computing the value of each weighed load, means for reading out data corresponding to said first position of said follow-up means and transmitting said data to said computer, control means responsive to establishment of said first position of said follow-up means for blocking further movement thereof while leaving said lever free for further deflection resulting from replacement of said first load by a second load and for simultaneously initiating the operation of said read-out means for said first load, means effective upon said blocking action of said control means for producing a signal thereof for said load replacement, means responsive to completion of the computing operation of said computing means for printing a record of the weight and value of said first load, means responsive to completion of the operation of said read-out means for said first load for terminating said blocking action of said control means to provide for reactuation of said follow-up means upon said further deflection of said lever during completion of the operation of said computer and said printing means for said first load.

7. In a system for weighing, computing and printing a record of the weight and value of each of a plurality of successively weighed loads, the combination of a scale including a lever adapted to be deflected away from a zero reference position in proportion to the weight of a first load applied to the scale, a shaft adapted to be displaced from a zero reference position to a first position corresponding to said first load, a reversible drive motor for driving said shaft, means actuated in response to deflection of said lever for energizing said motor to drive said shaft toward said first position thereof, a computer for computing the value of each weighed load, means for reading out data corresponding to said first position of said shaft and transmitting said data to said computer, control means responsive to establishment of said first position of said shaft for deenergizing said motor to hold said shaft in said first position thereof while leaving said lever free for further deflection resulting from replacement of said first load by a second load and for simultaneously initiating the operation of said read-out means for said first load, means responsive to completion of the computing operation of said computing means for printing a record of the weight and value of said first load, and means responsive to completion of the operation of said read-out means for said first load for terminating said deenergizing action of said control means to provide for reenergizing of said motor in response to said further deflection of said lever during completion of the operation of said computer and said printing means for said first load.

8. In a system for weighing, computing and printing a record of the weight and value of each of a plurality of successively weighed loads, the combination of a scale including a weighing mechanism adapted to be deflected away from a zero reference position in proportion to the weight of a first load applied to the scale to a first balance position corresponding to said first load, follow-up means actuated by deflection of said weighing mechanism to a first position corresponding to said first balance position of said weighing mechanism, a computer for computing the value of each weighed load, means for reading out data corresponding to said first position of said follow-up means and transmitting said data to said computer, control means responsive to establishiment of said first position of said follow-up means for blocking further movement thereof while leaving said weighing mechanism free for further deflection resulting from replacement of said first load by a second load and for simultaneously initiating the operation of said read-out means for said first load, means responsive to completion of the computing operation of said computing means for printing a record of the weight and value of said first load, and means responsive to completion of the operation of said read-out means for said first load for terminating said blocking action of said control means to provide for reactuation of said follow-up means by said further deflection of said weighing mechanism during completion of the operation of said computer and said printing means for said first load.

9. In a system for weighing, computing and printing a record of the weight and value of each of a plurality of successively weighed loads, the combination of a scale including a weighing mechanism adapted to be deflected away from a zero reference position in proportion to the weight of a first load applied to the scale to a first balance position corresponding to said first load, follow-up means actuated by deflection of said weighing mechanism to a first position corresponding to said first balance position of said weighing mechanism, a computer for computing the value of each weighed load, means responsive to establishment of said first position of said follow-up means for reading out data corresponding to said position and transmitting said data to said computer, means effective upon completion of said operation of said read-out means for causing reactuation of said follow-up means to a second position upon deflection of said weighing mechanism resulting from replacement of said first load by a second load, means responsive to completion of the computing operation of said computing means for printing a record of the weight and value of said specific load, and said computer including means for completing said computing operation for said first load simultaneously with said reactuation of said follow-up means for said second load.

10. A computing system for obtaining the product of two factors in combination with means for producing partial products of the digits of one factor by the digits of the other factor in the form of a units and a tens portion and for arranging each portion of each such partial product in columns of corresponding value, comprising means for expressing each said partial product digit below 5 in terms of its true digital value, means for converting each said partial product digit in the range of 5–9 to a code based on the use of a 5 plus a digit less than 5 means for adding said digits below 5 in the lowest order column on a quinary basis providing a digit not greater than 4 plus an appropriate number of 5's, means for storing said digit not greater than 4, means for counting the total number of 5's in said lowest order column produced by said converting means and by said quinary adding means, means for determining the number of pairs of said counted 5's, means for temporarily storing said number of pairs of 5's to be used as a decimal carry in the next higher order column, means responsive to an uneven number of said counted 5's for adding 5 to said stored digit, and means for effecting similar operations for each successive higher order column including the addition of said carry therein.

11. A computing system for obtaining the product of two factors in combination with means for producing partial products of the digits of one factor by the digits of the other factor in the form of a units and a tens portion and for arranging each portion of each such partial product in columns of corresponding value, comprising means for expressing each said partial product digit below 5 in the lowest order column in terms of its true digital value, means for converting each said partial product digit in the range of 5–9 in said lowest order column to a code based on the use of 5 plus a digit less than 5, means for adding said digits below 5 on a quinary basis providing a digit not greater than 4 plus an appropriate number of 5's, means for storing said digit not greater than 4, means for counting the total number of 5's produced by said converting means and by said quinary adding means, means for determining the number of pairs of said counted 5's, means for temporarily storing said number of pairs of 5's to be used as a decimal carry in the next higher order column, means responsive to an uneven number of said counted 5's for adding 5 to said stored digit, and means for effecting similar operations for each successive higher order column including the addition of said carry therein.

12. A computing system for obtaining the product of two factors in combination with means for producing partial products of the digits of one factor by the digits of the other factor in the form of a units and a tens portion and for arranging each portion of each such partial product in columns of corresponding value, comprising means for expressing each said partial product digit below 5 in the lowest order column in terms of its true digital value, means for converting each said partial product digit in the range of 5–9 in said lowest order column to a code based on the use of 5 plus a digit less than 5, means for adding said digits below 5 on a quinary basis providing a digit not greater than 4 plus an appropriate number of 5's, means for storing said digit not greater than 4, means for counting the total number of 5's produced by said converting means and by said quinary adding means, means for determining the number of pairs of said counted 5's, means for temporarily storing said number of pairs of 5's to be used as a decimal carry in the next higher order column, means responsive to an uneven number of said counted 5's for adding 5 to said stored digit, and means for causing said previously mentioned means to carry out similar operations for each successive higher order column including the addition of said carry therein.

13. A computing system for obtaining the product of two factors in combination with means for producing partial products of the digits of one factor by the digits of the other factor in the form of a units and a tens portion and for arranging each portion of each such partial product in columns of corresponding value, comprising means for expressing each said partial product digit below 5 in the lowest order column in terms of its true digital value, means for converting each said partial product digit in the range of 5–9 in said lowest order column to a code based on the use of 5 plus a digit less than 5, means for adding said digits below 5 on a quinary basis providing a digit not greater than 4 plus an appropriate number of 5's, means for storing said digit not greater than 4, means for counting the total number of 5's produced by said converting means and by said quinary adding means, means for determining the number of pairs of said counted 5's, means responsive to an uneven number of said counted 5's for adding 5 to said stored digit, a pair of switch means each capable of receiving a digit representing said number of pairs of 5's in a lower order column and of delivering such digit as a decimal carry to the next higher order column, means for causing one of said switch means to receive said digit from said lowest order column from said determining means, and means for effecting similar operations for each successive higher order column including means for causing said one switch means to deliver said received digit to the next higher order column while the other said switch means receives the digit representing the number of pairs of 5's in said next higher order column and for causing said pair of switch means to continue said alternation of function as the addition proceeds from one column to the next.

14. A computing system for obtaining the product of two factors in combination with means for producing partial products of the digits of one factor by the digits of the other factor in the form of a units and a tens portion and for arranging each portion of each such partial product in columns of corresponding value, comprising means for expressing each said partial product digit below 5 in the lowest order column in terms of its true digital value, means for converting each said partial product digit in the range of 5–9 in said lowest order column to a code based on the use of 5 plus a digit less than 5, means for adding said digits below 5 on a quinary basis providing a digit not greater than 4 plus an appropriate number of 5's, means for storing said digit not greater than 4, means for counting the total number of 5's produced by said converting means and by said quinary adding means, means for determining the number of pairs of said counted 5's, means responsive to an uneven number of said counted 5's for adding 5 to said stored digit, a pair of switch means each capable of receiving a digit representing said number of pairs of 5's in a lower order column and of delivering such digit as a decimal carry to the next higher order column, means for causing one of said switch means to deliver a zero to said lowest order column, means for causing the other of said switch means to receive said carry digit from said lowest order column from said determining means, and means for effecting similar operations for each successive higher order column including means for causing said other switch means to deliver said received digit to the next higher order column while said one switch means receives the digit representing the number of pairs of 5's in said next higher order column and for causing said pair of switch means to continue said alternation of function as the addition proceeds from one column to the next.

15. A computing system for obtaining the product of two factors in combination with means for producing partial products of the digits of one factor by the digits of the other factor in the form of a units and a tens portion and for arranging each portion of each such partial product in columns of corresponding value, comprising means for summing said partial product digits in the lowest order column, means for storing the digit representing the units portion of such sum, a pair of switch means each capable of receiving a digit representing the tens portion of the sum of a lower order column and delivering such digit as a decimal carry to the next higher order column, means for causing one of said switch means to receive such digit from said lowest order column, means for causing said summing means to sum the remainder of said columns in their order of value including means for causing said one switch means to deliver said digit to said next higher order column while the other said switch means receives the digit representing the tens portion of the sum of said next higher order column, means for separately storing the digit representing the units portion of the sum of each column, and means for causing said pair of switch means to continue said alternation of function as the addition proceeds from one column to the next.

16. A computing system for obtaining the product of two factors in combination with means for producing partial products of the digits of one factor by the digits of the other factor in the form of a units and a tens portion and for arranging each portion of each such partial product in columns of corresponding value, comprising means for summing said partial product digits in the lowest order column, means for storing the digit representing the units portion of such sum, a pair of switch means each capable of receiving a digit representing the tens portion of the sum of a lower order column and delivering such digit as a decimal carry to the next higher order column, means for causing one of said switch means to deliver a zero to said lowest order column in conjunction with the operation of said summing means on said column, means for causing the other of said switch means to receive said decimal carry digit from said lowest order column, means for causing said summing means to sum the remainder of said columns in their order of value including means for causing said other switch means to deliver said carry digit to said next higher order column while said one switch means receives the digit representing the tens portion of the sum of said next higher order column, means for separately storing the digit representing the units portion of the sum of each column, and means for causing said pair of switch means to continue said alternation of function as the addition proceeds from one column to the next.

17. In an electrical system for producing the product of two factors including a multiplying mechanism for separately and selectively producing the digits representing the units and tens portion of the partial product of each digit of one of said factors by each digit of the other said factor, means for causing the multiplying mechanism to produce only the digit of each such partial product which falls in a selected column, summing means for obtaining the sum of the digits in a selected column, and means for causing the multiplying mechanism and the summing means to repeat said producing and summing operations sequentially for all columns beginning with the lowest order thereof, the combination of a pair of switch means each capable of receiving a digit representing the tens portion of the sum of a lower order column and delivering such digit as a decimal carry to the next higher order column, means for causing one of said switch means to deliver a zero to said lowest order column in conjunction with the operation of said summing means thereon, means for causing the other of said switch means to receive such digit from said lowest order column, means cooperating with the summing means to cause said other switch means to deliver said digit to said next higher order column while said one switch means receives the digit representing the tens portion of the sum of said next higher order column, and means for causing said pair of switch means to continue said alternation of function as the addition proceeds from one column to the next.

18. In an electrical system for producing the product of two factors including a multiplying mechanism for separately and selectively producing the digits representing the units and tens portion of the partial product of each digit of one of said factors by each digit of the other said factor, means for causing the multiplying mechanism to produce only the digit of each such partial product which falls in a selected column, summing means for obtaining the sum of the digits in a selected column, and means for causing the multiplying mechanism and the summing means to repeat said producing and summing operations sequentially for all columns beginning with the lowest order thereof, the combination of a pair of switch means each capable of receiving a digit representing the tens portion of the sum of a lower order column and delivering such digit as a decimal carry to the next higher order column, means for causing one of said switch means to receive such digit from said lowest order column, means cooperating with the summing means to cause said one switch means to deliver said digit to said next higher order column while the other said switch means receives the digit representing the tens portion of the sum of said next higher order column, and means for causing said pair of switch means to continue said alternation of function as the addition proceeds from one column to the next.

19. In a system for weighing, computing and printing a record of the weight and value of each of a plurality of successively weighed loads, the combination of a scale including a weighing mechanism adapted to be deflected away from a zero reference position in proportion to the weight of a load applied to the scale to a balance position corresponding to said load, electrical means for computing the value of each weighed load, means for reading out data corresponding to said balance position of said weighing mechanism and transmitting said data to said computing means, electrical control means responsive to establishment of said balance position of said weighing mechanism for initiating the operation of said read-out means, means establishing a range of weight for said system having maximum and minimum limits, means for sensing a balance position of said weighing mechanism outside of said range and for sensing temporary failure of the power supply to said computing means during operation thereof, means responsive to completion of the computing operation of said computing means for printing a record of the weight and value of said load, and means controlled by said sensing means for preventing the printing of said record by said printing means whenever said balance position of said weighing mechanism is outside of said range or whenever there is a temporarily failure of said power supply during operation of said computing means.

20. In a system for weighing, computing and printing a record of the weight and value of each of a plurality of successively weighed loads, the combination of a scale including a weighing mechanism adapted to be deflected away from a zero reference position in proportion to the weight of a load applied to the scale to a balance position corresponding to said load, electrical means for computing the value of each weighed load, means for reading out data corresponding to said balance position of said weighing mechanism and transmitting said data to said computing means, electrical control means responsive to establishment of said balance position of said weighing mechanism for initiating the operation of said read-out means, means for sensing temporary failure of the power supply to said computing means during operation thereof, means responsive to completion of the computing operation of said computing means for printing a record of the weight and value of said load, and means controlled by said sensing means for preventing the printing of said record by said printing means whenever there is a temporarily failure of said power supply during operation of said computing means.

21. In a system fror weighing, computing and printing a record of the weight and value of each of a plurality of successively weighed loads, the combintion of a scale including weighing means adapted to be deflected away from a zero reference position in proportion to the weight of a first load applied to the scale to a first balance position corresponding to the weight of said first load, a computer for computing the value of each weighed load, means responsive to establishment of said first position of said weighing means for reading out data corresponding to said position and transmitting said data to said computer, means for causing reactuation of said weighing means to a second balance position upon replacement of said first load by a second load and completion of the operation of said read-out means, means responsive to completion of the computing operation of said computing means for printing a record of the weight and value of said specific load, said computer including means for completing said computing operation for said first load simultaneously with said reactuation of said weighing means for said second load, and means for sensing readiness of said weighing means for replacement of said first load and for producing a signal thereof.

22. In a system for weighing, computing and printing a record of the weight and value of each of a plurality of successively weighed loads, the combination of a scale including a weighing mechanism adapted to be deflected away from a zero reference position in proportion to the weight of a load applied to the scale to a balance position corresponding to said load, a computer for computing the value of each weighed load, means for reading out data corresponding to said balance position of said weighing mechanism and transmitting said data to said computer, control means responsive to establishment of said balance position of said weighing mechanism for initiating the operation of said read-out means, switch means for sensing the presence of a load on the scale and adapted to be moved to an operated position in response to removal of load from the scale, means establishing a range of weight for said system having maximum and minimum limits, means for sensing a balance position of said weighing mechanism outside of said range, means responsive to completion of the computing operation of said computer for printing a record of the weight and value of said load, means controlled by said sensing means for preventing the printing of said record by said printing means whenever said balance position of said weighing mechanism is outside of said range, and means for preventing the printing of said record by said printing means whenever said balance position of said weighing mechanism is within said range but said switch means is in said operated position thereof.

23. In a system for weighing, computing and printing a record of the weight and value of each of a plurality of successively weighed loads, the combination of a scale including a weighing mechanism adapted to be deflected away from a zero reference position in proportion to the weight of a load applied to the scale to a balance position corresponding to said load, a computer for computing the value of each weighed load, means for reading out data corresponding to said balance position of said weighing mechanism and transmitting said data to said computer, control means responsive to establishment of said balance position of said weighing mechanism for initiating the operation of said read-out means, switch means for detecting the presence of a load on the scale and adapted to be moved to an operated position in response to removal of load from the scale, means establishing a range of weight for said system having maximum and minimum limits, means for sensing a balance position of said weighing mechanism outside of said range, means responsive to completion of the computing operation of said computer for printing a record of the weight and value of said load, means for preventing the printing of said record by said printing means whenever said balance position of said weighing mechanism is within said range but said switch means is in said operated position thereof, manually operable means for selectively causing the printing of said record by said printing means independently of the position of said switch means, and means controlled by said sensing means for preventing the printing of said record by said printing means whenever said balance position of said weighing mechanism is outside of said range and independently of said manually operable means.

24. In a system for weighing, computing and printing a record of the weight and value of each of a plurality of successively weighed loads, the combination of a scale including a weighing mechanism adapted to be deflected away from a zero reference position in proportion to the weight of a load applied to the scale to a balance position corresponding to said load, a computer for computing the value of each weighed load, means for reading out data corresponding to said balance position of said weighing mechanism and transmitting said data to said computer, control means responsive to establishment of said balance position of said weighing mechanism for initiating the operation of said read-out means, switch means for sensing the pressure of a load on the scale and adapted to be moved to an operated position in response to removal of load from the scale, means responsive to completion of the computing operation of said computer for printing a record of the weight and value of said load, means for preventing the printing of said record by said printing means whenever said switch means is in said operated position thereof, and manually operable means for causing the printing of said record by said printing means independently of the position of said switch means.

25. In a system for weighing, computing and printing a record of the weight and value of each of a plurality of successively weighed loads, the combination of a scale including a weighing mechanism adapted to be deflected away from a zero reference position in proportion to the weight of a load applied to the scale to a balance position corresponding to said load, a computer for computing the value of each weighed load, means for reading out data corresponding to said balance position of said weighing mechanism and transmitting said data to said computer, control means responsive to establishment of said balance position of said weighing mechanism for initiating the operation of said read-out means, switch means movable between first and second positions and arranged to occupy said first position whenever said weighing mechanism is within a predetermined small range of movement from said zero reference position corresponding to a predetermined small weight on the scale, means responsive to completion of the computing operation of said computer for printing and recording of the weight and value of said load, means for preventing the printing of said record by said printing means whenever said switch means is in said first position thereof, said switch means in said second position thereof being ineffective to block operation of said printing means, and manually operable means for causing the printing of said record by said printing means when said switch means is in said first position thereof.

References Cited in the file of this patent

UNITED STATES PATENTS

| | | |
|---|---|---|
| 1,876,296 | Hofgaard | Sept. 6, 1932 |
| 2,070,824 | Boutet | Feb. 16, 1937 |
| 2,101,452 | Ranch | Dec. 7, 1937 |
| 2,182,001 | Pierce | Dec. 5, 1939 |
| 2,262,235 | Hofgaard | Nov. 11, 1941 |
| 2,376,234 | De Castro | May 15, 1945 |
| 2,406,848 | Novak | Sept. 3, 1946 |
| 2,413,859 | Brand | Jan. 7, 1947 |
| 2,420,167 | Dickinson et al. | May 6, 1947 |
| 2,473,466 | Bitner | Jan. 14, 1949 |
| 2,486,809 | Stibitz | Nov. 1, 1949 |
| 2,490,362 | Lake et al. | Dec. 6, 1949 |
| 2,521,418 | Sens-Olive | Sept. 5, 1950 |
| 2,536,951 | Luhn | Jan. 2, 1951 |
| 2,630,562 | Johnson | Mar. 3, 1953 |
| 2,631,778 | Piper et al. | Mar. 17, 1953 |
| 2,639,860 | Rieves | May 26, 1953 |
| 2,675,961 | Larsen | Apr. 20, 1954 |
| 2,723,801 | Luhn | Nov. 15, 1955 |
| 2,749,538 | Cooper et al. | June 5, 1956 |

FOREIGN PATENTS

| | | |
|---|---|---|
| 709,409 | Great Britain | May 26, 1954 |